United States Patent
Liao et al.

(10) Patent No.: US 12,285,923 B2
(45) Date of Patent: Apr. 29, 2025

(54) METHODS FOR PRODUCING POLYMER-CONTAINING COATINGS UPON CURED INNER LINERS, METHODS FOR PRODUCING TIRES CONTAINING SUCH INNER LINERS, AND TIRES CONTAINING SUCH INNER LINERS

(71) Applicant: Bridgestone Americas Tire Operations, LLC, Nashville, TN (US)

(72) Inventors: Kung-Ching Liao, Copley, OH (US); Jared J. Griebel, Orange Village, OH (US); Brian S. Alexander, Westfield, IN (US); Jiansheng Tang, Carmel, IN (US); Bradley S. Plotner, Canton, OH (US); Ross W. Widenor, Munroe Falls, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/492,349

(22) Filed: Oct. 23, 2023

(65) Prior Publication Data

US 2024/0100792 A1 Mar. 28, 2024

Related U.S. Application Data

(62) Division of application No. 16/466,874, filed as application No. PCT/US2017/066242 on Dec. 14, 2017, now Pat. No. 11,794,430.

(60) Provisional application No. 62/434,591, filed on Dec. 15, 2016.

(51) Int. Cl.
| | |
|---|---|
| B29D 30/00 | (2006.01) |
| B29D 30/06 | (2006.01) |
| B60C 1/00 | (2006.01) |
| C08G 18/83 | (2006.01) |
| C08G 65/336 | (2006.01) |
| C08K 3/011 | (2018.01) |
| C08K 3/22 | (2006.01) |
| C08K 3/36 | (2006.01) |
| C08K 5/00 | (2006.01) |
| C08K 5/105 | (2006.01) |
| C08K 5/13 | (2006.01) |
| C08K 5/17 | (2006.01) |
| C08L 23/22 | (2006.01) |
| C08L 43/04 | (2006.01) |
| C09D 171/02 | (2006.01) |
| C09D 175/04 | (2006.01) |

(52) U.S. Cl.
CPC ........ *B29D 30/0061* (2013.01); *B60C 1/0008* (2013.01); *C08G 18/837* (2013.01); *C08G 65/336* (2013.01); *C08K 3/011* (2018.01); *C08K 3/22* (2013.01); *C08K 3/36* (2013.01); *C08K 5/0016* (2013.01); *C08K 5/005* (2013.01); *C08K 5/105* (2013.01); *C08K 5/13* (2013.01); *C08K 5/17* (2013.01); *C08L 23/22* (2013.01); *C08L 43/04* (2013.01); *C09D 171/02* (2013.01); *C09D 175/04* (2013.01); *B29D 2030/0686* (2013.01); *C08K 2003/2206* (2013.01)

(58) Field of Classification Search
CPC ........ B29D 30/0061; B29D 2030/0686; B60C 1/0008; C08G 18/837; C08G 65/336; C08K 3/011; C08K 3/22; C08K 3/36; C08K 5/0016; C08K 5/005; C08K 5/105; C08K 5/13; C08K 5/17; C08K 2003/2206; C08L 23/22; C08L 43/04; C09D 171/02; C09D 175/04
See application file for complete search history.

(56) References Cited

U.S. PATENT DOCUMENTS

| | | | |
|---|---|---|---|
| 4,113,401 | A | 9/1978 | McDonald |
| 4,113,799 | A | 9/1978 | Van Ornum et al. |
| 4,116,895 | A | 9/1978 | Kageyama et al. |
| 4,359,078 | A | 11/1982 | Egan |
| 4,607,065 | A | 8/1986 | Kitamura et al. |
| 4,657,958 | A | 4/1987 | Fieldhouse et al. |
| 4,707,526 | A | 11/1987 | Sasaki et al. |
| 4,732,925 | A | 3/1988 | Davis |
| 4,778,852 | A | 10/1988 | Futamura |

(Continued)

FOREIGN PATENT DOCUMENTS

| | | |
|---|---|---|
| BR | PI1102846 A2 | 7/2013 |
| CN | 1259094 A | 7/2000 |

(Continued)

OTHER PUBLICATIONS

International Search Report and Written Opinion from PCT/US2017/066271 dated Apr. 9, 2018.

(Continued)

*Primary Examiner* — Angela C Scott
(74) *Attorney, Agent, or Firm* — Meredith E. Hooker; Jenny L. Sheaffer

(57) ABSTRACT

Methods for producing a polymer-containing coating upon a cured tire inner liner using a coating composition of specified composition are provided. Also provided are methods for producing a tire comprising a cured inner liner (with a polymer-containing coating upon its radially inward-facing surface) and at least one component positioned radially inward of the cured inner liner. Tires containing a cured inner liner (with a polymer-containing coating upon its radially inward-facing surface) and at least one component positioned radially inward of the cured inner liner are also disclosed.

19 Claims, No Drawings

(56) References Cited

U.S. PATENT DOCUMENTS

| | | |
|---|---|---|
| 4,810,565 A | 3/1989 | Wasitis et al. |
| 4,816,101 A | 3/1989 | Hong et al. |
| 4,913,209 A | 4/1990 | Hong et al. |
| 4,915,856 A | 4/1990 | Jamison |
| 4,971,831 A | 11/1990 | Ohba et al. |
| 5,085,942 A | 4/1992 | Hong et al. |
| 5,242,727 A | 9/1993 | Briddell et al. |
| 5,276,258 A | 1/1994 | Knobloch et al. |
| 5,389,715 A | 2/1995 | Davis et al. |
| 5,556,636 A | 9/1996 | Yano et al. |
| 5,738,813 A | 4/1998 | Naganawa |
| 5,849,133 A | 12/1998 | Senderling et al. |
| 5,985,981 A | 11/1999 | Alexander et al. |
| 6,101,767 A | 8/2000 | Georgeau |
| 6,103,811 A | 8/2000 | Midorikawa et al. |
| 6,120,869 A | 9/2000 | Cotsakis et al. |
| 6,183,551 B1 | 2/2001 | Okamoto et al. |
| 6,303,694 B1 | 10/2001 | Hogan et al. |
| 6,436,498 B1 | 8/2002 | Rangwalla et al. |
| 6,500,286 B1 | 12/2002 | Ishikawa et al. |
| 6,502,360 B2 | 1/2003 | Carr, III et al. |
| 6,505,455 B1 | 1/2003 | Georgeau |
| 6,530,409 B1 | 3/2003 | Ishikawa et al. |
| 6,679,018 B2 | 1/2004 | Georgeau et al. |
| 6,803,412 B2 | 10/2004 | Nguyen-Misra et al. |
| 7,175,732 B2 | 2/2007 | Robinson et al. |
| 7,182,114 B2 | 2/2007 | Yukawa |
| 7,189,781 B2 | 3/2007 | Acevedo et al. |
| 7,317,051 B2 | 1/2008 | Georgeau et al. |
| 7,484,544 B2 | 2/2009 | Serra et al. |
| 7,671,144 B2 | 3/2010 | Fujimoto et al. |
| 7,681,613 B2 | 3/2010 | Yukawa et al. |
| 7,717,146 B2 | 5/2010 | Yukawa et al. |
| 7,743,808 B2 | 6/2010 | Yukawa |
| 7,767,308 B2 | 8/2010 | Georgeau et al. |
| 7,772,301 B2 | 8/2010 | Fensel et al. |
| 8,028,796 B2 | 10/2011 | Ishihara |
| 8,221,849 B2 | 7/2012 | Naito |
| 8,245,743 B2 | 8/2012 | Hahn et al. |
| 8,333,437 B2 | 12/2012 | Matsuda et al. |
| 8,534,331 B2 | 9/2013 | Dubos et al. |
| 8,999,093 B2 | 4/2015 | Yukawa |
| 9,108,373 B2 | 8/2015 | Tanno et al. |
| 11,794,430 B2* | 10/2023 | Liao ..................... C08K 3/011 |
| 2001/0000788 A1 | 5/2001 | Ono et al. |
| 2002/0115770 A1 | 8/2002 | Georgeau et al. |
| 2004/0176518 A1 | 9/2004 | Okamoto et al. |
| 2004/0214950 A1 | 10/2004 | Nakamure |
| 2005/0098252 A1 | 5/2005 | Muraoka et al. |
| 2005/0107499 A1 | 5/2005 | Georgeau et al. |
| 2005/0143496 A1 | 6/2005 | Mueller |
| 2005/0155686 A1 | 7/2005 | Yukawa et al. |
| 2005/0284536 A1 | 12/2005 | Kojima et al. |
| 2006/0205907 A1 | 9/2006 | Guyer et al. |
| 2007/0088137 A1 | 4/2007 | Georgeau et al. |
| 2007/0282080 A1 | 12/2007 | Kawakami et al. |
| 2008/0237537 A1 | 10/2008 | Huang et al. |
| 2008/0264541 A1 | 10/2008 | Laubry et al. |
| 2008/0292902 A1 | 11/2008 | Reid et al. |
| 2009/0005498 A1 | 1/2009 | Lin et al. |
| 2009/0018260 A1 | 1/2009 | Correia et al. |
| 2009/0023837 A1 | 1/2009 | Okamatsu et al. |
| 2009/0318599 A1 | 12/2009 | Brokamp |
| 2010/0043933 A1 | 2/2010 | Breunig |
| 2010/0068530 A1 | 3/2010 | Laubry |
| 2010/0173167 A1 | 7/2010 | Vissing et al. |
| 2010/0317796 A1 | 12/2010 | Huang et al. |
| 2011/0003920 A1 | 1/2011 | Matsuda et al. |
| 2011/0056694 A1 | 3/2011 | Sears et al. |
| 2011/0247674 A1 | 10/2011 | Fujii et al. |
| 2011/0308706 A1 | 12/2011 | Sandstrom et al. |
| 2012/0040191 A1 | 2/2012 | Kohl et al. |
| 2012/0123016 A1 | 5/2012 | Bolte et al. |
| 2012/0125507 A1 | 5/2012 | Bormann et al. |
| 2012/0232210 A1 | 9/2012 | Cheng et al. |
| 2013/0023617 A1 | 1/2013 | Okamato |
| 2013/0032262 A1 | 2/2013 | Bormann et al. |
| 2013/0108882 A1 | 5/2013 | Stuart et al. |
| 2013/0146195 A1 | 6/2013 | Dubos et al. |
| 2013/0192736 A1 | 8/2013 | Song et al. |
| 2013/0228259 A1 | 9/2013 | Breunig |
| 2013/0260146 A1 | 10/2013 | Wright et al. |
| 2014/0110032 A1 | 4/2014 | Ogasawara et al. |
| 2014/0124114 A1 | 5/2014 | Hayashi et al. |
| 2014/0138004 A1 | 5/2014 | Voge et al. |
| 2014/0261965 A1* | 9/2014 | Tang ...................... B32B 37/12 525/105 |
| 2014/0329102 A1 | 11/2014 | Randall et al. |
| 2015/0184045 A1 | 7/2015 | Goubard et al. |
| 2015/0273944 A1 | 10/2015 | Yukawa |
| 2015/0284610 A1 | 10/2015 | Zander et al. |
| 2015/0368512 A1 | 12/2015 | Bowman et al. |
| 2016/0032158 A1 | 2/2016 | Tang et al. |
| 2016/0068031 A1 | 3/2016 | Kaszas et al. |
| 2016/0340905 A1 | 11/2016 | Tang et al. |
| 2016/0362893 A1 | 12/2016 | Tang et al. |
| 2017/0050474 A1* | 2/2017 | Laubry ................... C08J 5/128 |
| 2017/0297281 A1 | 10/2017 | Yukawa et al. |
| 2018/0016400 A1 | 1/2018 | Gutacker et al. |
| 2019/0256745 A1 | 8/2019 | Goubard et al. |

FOREIGN PATENT DOCUMENTS

| | | |
|---|---|---|
| CN | 101939349 A | 1/2011 |
| CN | 103158437 A | 6/2013 |
| CN | 103648798 A | 3/2014 |
| EP | 0135463 A1 | 3/1985 |
| EP | 0160614 A2 | 11/1985 |
| EP | 1174251 A2 | 1/2002 |
| EP | 1418199 A1 | 5/2002 |
| EP | 1418199 A | 5/2004 |
| EP | 1090069 B1 | 7/2004 |
| EP | 0991530 B1 | 9/2004 |
| EP | 1462500 A1 | 9/2004 |
| EP | 1512552 A2 | 3/2005 |
| EP | 1544254 A1 | 6/2005 |
| EP | 2335911 A1 | 6/2011 |
| EP | 2738017 A1 | 6/2014 |
| EP | 2993061 A1 | 3/2016 |
| EP | 3009473 A1 | 4/2016 |
| EP | 3093165 A1 | 11/2016 |
| FR | 2273682 A1 | 1/1976 |
| JP | S53-97046 A | 8/1978 |
| JP | S55-127212 A | 10/1980 |
| JP | S60-64834 A | 4/1985 |
| JP | H01-113483 A | 5/1989 |
| JP | H09-187869 A | 7/1997 |
| JP | 10087884 A | 4/1998 |
| JP | 2002-363484 A | 12/2002 |
| JP | 200589596 A | 4/2005 |
| JP | 2005089596 A | 4/2005 |
| JP | 2006-007760 A | 1/2006 |
| JP | 2008133404 A | 6/2008 |
| JP | 2009-029972 A | 2/2009 |
| JP | 2009215497 A | 9/2009 |
| JP | 2009255601 A | 11/2009 |
| JP | 2010-106159 A | 5/2010 |
| JP | 2011-31709 A | 2/2011 |
| JP | 201391754 A | 5/2013 |
| JP | 2013091754 A | 5/2013 |
| JP | 2015-101672 A | 6/2015 |
| JP | 2015-107690 A | 6/2015 |
| JP | 2015-131957 A | 7/2015 |
| JP | 2015182675 A | 10/2015 |
| JP | 2016-78817 A | 5/2016 |
| JP | 2016-514734 A | 5/2016 |
| KR | 20020037593 A | 5/2002 |
| KR | 10-0982923 B1 | 9/2010 |
| WO | 2000-37534 A1 | 6/2000 |
| WO | 2007/128797 A1 | 11/2007 |
| WO | 2008-013183 A1 | 1/2008 |
| WO | 2009-006915 A1 | 1/2009 |
| WO | 2009058420 A1 | 5/2009 |
| WO | 2014-095650 A1 | 8/2014 |

(56) References Cited

FOREIGN PATENT DOCUMENTS

| WO | 2014-145482 | A1 | | 9/2014 | |
| WO | 2014198432 | A1 | | 12/2014 | |
| WO | 2015/075040 | A1 | | 3/2015 | |
| WO | 2015074031 | A1 | | 5/2015 | |
| WO | 2015/143065 | A1 | | 9/2015 | |
| WO | WO-2015165899 | A1 | * | 11/2015 | ........... B32B 27/065 |
| WO | 2016-115560 | A1 | | 7/2016 | |
| WO | 2016-146648 | A1 | | 9/2016 | |

OTHER PUBLICATIONS

International Search Report and Written Opinion from PCT/US2017/066368 dated Apr. 10, 2018.
International Preliminary Report on Patentability from PCT/US2017/38493 dated Dec. 25, 2018.
International Preliminary Report on Patentability from PCT/US2017/39516 dated Jan. 1, 2019.
International Preliminary Report on Patentability from PCT/US2017/66271 dated Jun. 18, 2019.
International Preliminary Report on Patentability from PCT/US2017/40024 dated Jan. 1, 2019.
International Preliminary Report on Patentability from PCT/US2017/66368 dated Jun. 18, 2019.
International Preliminary Report on Patentability from PCT/US2017/66242 dated Jun. 18, 2019.
INEOS Oligomers—INDOL Polybutene Specifications and Typical, undated, downloaded Oct. 28, 2016.
Technical Information Sheet—QuickSeam Splice Tape, last modified Jul. 25, 2013.
Technical Information Sheet—EcoWhite QuickSeam Splice Tape, last modified Dec. 8, 2015.
International Search Report from PCT/US2017/38493 dated Aug. 23, 2017.
International Search Report and Written Opinion from PCT/US2017/39516 dated Aug. 28, 2017.
International Search Report and Written Opinion from PCT/US2017/040024 dated Aug. 28, 2017.
International Search Report and Written Opinion from PCT/US2017/66242 dated Mar. 30, 2018.
Hepworth, Paul, Chemistry and Technology of Surfactants, Chapter 5 Non-ionic Surfactants, Copyright 2006.
Lee, Myung Jin, International Search Report with Written Opinion from PCT/US2017/039516, 12 pp. (Aug. 28, 2017).
Safety Data Sheet for QuickPrime Plus LVOC from Firestone Building Products Company, last revised Feb. 20, 2015.
Safety Data Sheet for QuickPrime Plus Primer from Firestone Building Products Company, last revised Jan. 29, 2016.
Safety Data Sheet for Single-Ply LVOC Primer from Firestone Building Products Company, last revised Mar. 11, 2014.
Safety Data Sheet for Single-Ply QuickPrime Primer from Firestone Building Products Company, last revised Jan. 28, 2013.
Technical Information Sheet for QuickPrime Plus LVOC from Firestone Building Products Company, last revised Feb. 13, 2012.
Technical Information Sheet for QuickPrime Plus from Firestone Building Products Company, last revised Aug. 2, 2013.
Technical Information Sheet for Single-Ply LVOC Bonding Adhesive-1168 from Firestone Building Products Company, last revised Jan. 17, 2012.
Technical Information Sheet for Single-Ply LVOC Bonding Adhesive from Firestone Building Products Company, last revised Sep. 17, 2015.
Technical Information Sheet for Single-Ply QuickPrime Primer from Firestone Building Products Company, last revised Feb. 21, 2012.
Lee, Myung Jin, International Search Report with Written Opinion from PCT/US2017/040024, 13 pp. (Aug. 28, 2017).
Jang, Gijeong, International Search Report with Written Opinion from PCT/US2017/066242, 13 pp. (Mar. 30, 2018).
Technical Information Sheet, EPDM—Solvent Free Bonding Adhesive, 4 pages, dated Nov. 7, 2016.
Technical Datasheet, Momentive SPUR 1050MM, dated Sep. 10, 2011.
Marketing Bulletin, Momentive SPUR 1050MM, dated Mar. 2017.
Technical Datasheet, Momentive SPUR 1015LM, dated Jan. 23, 2016.
Marketing Bulletin, Momentive SPUR 1015LM, dated Mar. 2017.
Kaneka MS Polymer, dated Dec. 9, 2016.
Technical Data Sheet, Geniosil STP E 30, dated Jul. 31, 2015.
Technical Data Sheet, Geniosil STP E 35, dated May 8, 2015.
Statement of Opposition as filed Sep. 17, 2021 against Japanese patent No. 68-48062B2 (including English language translation).
Shin Etsu, Silicone Release Coatings, Shin-Etsu Integrated System, dated Oct. 2012 (8 pages).
International Search Report from PCT application No. PCT/US2017/038493, dated Aug. 2017 (3 pages).
International Preliminary Report on Patentability and Written Opinion from PCT application No. PCT/US2017/038493, dated Dec. 2018 (10 pages).
3M, Low Fogging Adhesive Transfer Tapes, Technical Data, dated Oct. 2008 (4 pages).
European Extended Search Report and Search Opinion from EP application No. 17821258.5, transmitted by the European Patent Office on Jan. 30, 2020.
European Extended Search Report and Search Opinion from EP application No. 17879743.7, transmitted by the European Patent Office on Jul. 31, 2020.
European Extended Search Report and Search Opinion from EP application No. 17880817.6 transmitted by the European Patent Office on Jul. 13, 2020.
Notice of Reasons for Refusal as mailed Feb. 9, 2022 from Opposition against Japanese patent No. 68-48062B2 (including English language translation).
International Search Report for Application No. PCT/US2014/030257 dated Sep. 17, 2014.
Written Opinion for Application No. PCT/US2014/030257 dated Sep. 2015.
Kristalex 3100 hydrocarbon resin data sheet; Eastman Chemical Company, 2019. (Year: 2019).
Written Opinion and IPRP for Application No. PCT/US2014/066101 dated May 2015.
International Search Report for Application No. PCT/US2014/066101 dated Jan. 27, 2015.
Kristalex 3100 hydrocarbon resin technical data sheet; Eastman Chemical Company; dated Feb. 28, 2018.
European Extended Search Report and Search Opinion from EP application No. 17879667.8, transmitted by European Patent Office on Jul. 30, 2020.

* cited by examiner

METHODS FOR PRODUCING POLYMER-CONTAINING COATINGS UPON CURED INNER LINERS, METHODS FOR PRODUCING TIRES CONTAINING SUCH INNER LINERS, AND TIRES CONTAINING SUCH INNER LINERS

CROSS REFERENCE TO RELATED APPLICATIONS

This application is a divisional of U.S. application Ser. No. 16/466,874, filed Jun. 5, 2019 which is a U.S. national stage of International Application Number PCT/US2017/062242 filed on Dec. 14, 2017, which claims priority to U.S. provisional application Ser. No. 62/434,591, filed Dec. 15, 2016, all of which are hereby incorporated by reference in their entirety.

FIELD

The present application is directed to methods for producing a polymer-containing coating upon a cured tire inner liner; methods for producing a tire comprising a cured inner liner (with a polymer-containing coating upon its radially inward-facing surface) and at least one component positioned radially inward of the cured inner liner; and to tires containing a cured inner liner (with a polymer-containing coating upon its radially inward-facing surface) and at least one component positioned radially inward of the cured inner liner.

BACKGROUND

When an uncured tire is placed into a tire mold for curing, the radially innermost component of the tire is often the inner liner. During the curing process that takes place in the tire mold, a bladder is inflated and presses against the radially inward-facing surface of the inner liner (the lower surface of the inner liner). In order to prevent sticking (or co-curing) of the lower surface of the inner liner to the bladder, a polysiloxane-containing release may be applied to the lower surface of inner liner (prior to the tire body being placed into the tire mold). While the polysiloxane-containing release provides the advantage of preventing sticking of the inner liner surface to the bladder in the tire mold, it is disadvantageous after the cured tire is removed from the mold because it remains upon the lower surface of the cured inner liner (as part of the rubber) and inhibits adhesion of other materials to the lower surface. Alternatively, some tires are manufactured without the lower surface of their inner liner being treated with a polysiloxane-containing release. Regardless of whether the inner liner has been release treated, after a tire having a cured inner liner is removed from a tire mold, it may be desirable to install one or more components within the tire radially inward of the inner liner. Exemplary such components include noise barriers (e.g., foam noise barriers), an air barrier layer, a sealant layer, a run-flat insert, or an electronic communication module.

SUMMARY

Disclosed herein are methods for methods for producing a polymer-containing coating upon a cured tire inner liner; methods for producing a tire comprising a cured inner liner (with a polymer-containing coating upon its radially inward-facing surface) and at least one component positioned radially inward of the cured inner liner; and tires containing a cured inner liner (with a polymer-containing coating upon its radially inward-facing surface) and at least one component positioned radially inward of the cured inner liner.

In a first embodiment, a method for producing a polymer-containing coating upon a cured inner liner for a tire is provided. The method comprises: (a) providing a cured inner liner comprising rubber, a majority of which comprises butyl rubber (optionally halogenated), wherein the cured inner liner has an upper and a lower surface, (b) treating the lower surface of the cured inner liner with a coating composition comprising specified ingredients, thereby creating a polymer-containing coating upon the treated surface of the cured inner liner. According to the first embodiment, the coating composition comprises: (i) a silyl-terminated polymer, (ii) optionally at least one plasticizer, (iii) at least one tackifier, (iv) at least one adhesion promoter, (v) optionally at least one moisture scavenger, (vi) at least one catalyst, and (vii) optionally at least one antioxidant.

In a second embodiment, a method for producing a tire comprising a cured inner liner and at least one component positioned radially inward of the cured inner liner is provided. The method comprises: (a) providing a tire body comprising a cured inner liner comprising rubber, a majority of which comprises butyl rubber (optionally halogenated), wherein the cured inner liner comprises an upper surface and a lower surface which is radially inward-facing within the tire body; (b) treating the lower surface of the cured inner liner with a coating composition comprising specified ingredients, thereby forming a polymer-containing coating upon the radially inward-facing surface of the cured inner liner; and (c) providing a tire component and adhering the component to the polymer-containing coating upon the radially inward-facing surface of the cured inner liner. According to the second embodiment, the coating composition comprises: (i) a silyl-terminated polymer, (ii) optionally at least one plasticizer, (iii) at least one tackifier, (iv) at least one adhesion promoter, (v) optionally at least one moisture scavenger, (vi) at least one catalyst, and (vii) optionally at least one antioxidant.

In a third embodiment, a cured tire comprising a tire body, a cured inner liner, and at least one component positioned radially inward of the cured inner liner is provided. According to the third embodiment, the cured inner liner comprises rubber, a majority of which comprises butyl rubber (optionally halogenated), and the cured inner liner has an upper surface and a lower surface with the lower surface positioned radially inward within the tire. According to the third embodiment, the lower surface of the cured inner liner includes a polymer-containing coating comprising: (i) a silyl-terminated polymer, (ii) optionally at least one plasticizer, (iii) at least one tackifier, (iv) at least one adhesion promoter, (v) optionally at least one moisture scavenger, (vi) at least one catalyst, and (vii) optionally at least one antioxidant. Further according to the third embodiment, the at least one component positioned radially inward of the cured inner liner is adhered to the polymer-containing coating of the lower surface of the cured inner liner. Also according to the third embodiment, the polymer-containing coating has a thickness of about 10 to about 1000 micrometers.

DETAILED DESCRIPTION

Disclosed herein are methods for methods for producing a polymer-containing coating upon a cured tire inner liner; methods for producing a tire comprising a cured inner liner (with a polymer-containing coating upon its radially inward-facing surface) and at least one component positioned radially inward of the cured inner liner; and tires containing a cured inner liner (with a polymer-containing coating upon its radially inward-facing surface) and at least one component positioned radially inward of the cured inner liner. In a first embodiment, a method for producing a polymer-containing coating upon a cured inner liner for a tire is provided. The method comprises: (a) providing a cured inner liner comprising rubber, a majority of which comprises butyl rubber (optionally halogenated), wherein the cured inner liner has an upper and a lower surface, (b) treating the lower surface of the cured inner liner with a coating composition comprising specified ingredients, thereby creating a polymer-containing coating upon the treated surface of the cured inner liner. According to the first embodiment, the coating composition comprises: (i) a silyl-terminated polymer, (ii) optionally at least one plasticizer, (iii) at least one tackifier, (iv) at least one adhesion promoter, (v) optionally at least one moisture scavenger, (vi) at least one catalyst, and (vii) optionally at least one antioxidant.

In a second embodiment, a method for producing a tire comprising a cured inner liner and at least one component positioned radially inward of the cured inner liner is provided. The method comprises: (a) providing a tire body comprising a cured inner liner comprising rubber, a majority of which comprises butyl rubber (optionally halogenated), wherein the cured inner liner comprises an upper surface and a lower surface which is radially inward-facing within the tire body; (b) treating the lower surface of the cured inner liner with a coating composition comprising specified ingredients, thereby forming a polymer-containing coating upon the radially inward-facing surface of the cured inner liner; and (c) providing a tire component and adhering the component to the polymer-containing coating upon the radially inward-facing surface of the cured inner liner. According to the second embodiment, the coating composition comprises: (i) a silyl-terminated polymer, (ii) optionally at least one plasticizer, (iii) at least one tackifier, (iv) at least one adhesion promoter, (v) optionally at least one moisture scavenger, (vi) at least one catalyst, and (vii) optionally at least one antioxidant.

In a third embodiment, a cured tire comprising a tire body, a cured inner liner, and at least one component positioned radially inward of the cured inner liner is provided. According to the third embodiment, the cured inner liner comprises rubber, a majority of which comprises butyl rubber (optionally halogenated), and the cured inner liner has an upper surface and a lower surface with the lower surface positioned radially inward within the tire. According to the third embodiment, the lower surface of the cured inner liner includes a polymer-containing coating comprising: (i) a silyl-terminated polymer, (ii) optionally at least one plasticizer, (iii) at least one tackifier, (iv) at least one adhesion promoter, (v) optionally at least one moisture scavenger, (vi) at least one catalyst, and (vii) optionally at least one antioxidant. Further according to the third embodiment, the at least one component positioned radially inward of the cured inner liner is adhered to the polymer-containing coating of the lower surface of the cured inner liner. Also according to the third embodiment, the polymer-containing coating has a thickness of about 10 to about 1000 micrometers.

Definitions

The terminology as set forth herein is for description of the embodiments only and should not be construed as limiting the invention as a whole.

As used herein, the term "majority" means more than 50% (e.g., 50.5%, 51%, 60%, etc.) and may encompass 100%.

As used herein, the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

As used herein the term "radially inward" and "radially inward-facing" are relative terms indicating that a component is positioned or arranged closer to or facing the radially inner portion of a tire, with the understanding that the road-contacting tread is generally the radially outermost portion of a tire. As a non-limiting example, body plies within a tire are positioned radially inward of the road-contacting tread of the tire.

Treated, Cured Inner Liner

As discussed above, according to the methods of the first and second embodiments, the lower surface of a cured inner liner (the radially inward-facing surface when the inner liner is present in a tire) is treated with a coating composition, thereby producing a polymer-containing coating upon the lower surface of the cured inner liner (the radially inward-facing surface of the inner liner when the inner liner is present in a tire). After treatment with the coating composition, the cured inner liner may be referred to as a treated inner liner or a treated, cured inner liner. Alternatively, since treatment with the coating composition produces a polymer-containing coating upon the lower surface of the cured inner liner, the treated inner liner may also be referred to as a coated inner liner or a coated, cured inner liner.

Coating Composition/Polymer-Containing Coating

As discussed above, according to the methods of the first and second embodiments, the lower surface of a cured inner liner (the radially inward-facing surface when the inner liner is present in a tire) is treated with a coating composition, thereby producing a polymer-containing coating upon the lower surface of the cured inner liner (the radially inward-facing surface of the inner liner when the inner liner is present in a tire). The specified composition used in the methods of the first and second embodiments is referred to herein as a coating composition. As also discussed above, according to the third embodiment, a tire is disclosed which includes a cured inner liner with its lower surface (the radially inward-facing surface) including a polymer-containing coating. The polymer-containing coating upon the lower surface of the inner liner results from the coating composition. Generally, according to the embodiments described herein, the composition of the coating composition and the resulting polymer-containing coating will be very similar (if not identical) since a majority (or even all) of the preferred ingredients of the coating composition are neither volatile nor physically penetrate into the rubber of the cured inner liner. Without being bound by theory, it is believed that a type of chemical bonding may take place between the coating composition/polymer-containing coating and the underlying cured inner liner.

Silyl-Terminated Polymer

As discussed above, according to the first-third embodiments, the coating composition and/or the polymer-containing coating comprises (includes) a silyl-terminated polymer. One or more than one silyl-terminated polymer may be utilized and the amount and composition of such polymer(s) may vary as discussed below. The term silyl is used herein to refer to a functional group containing at least one silicon atom having at least one hydrolyzable group (e.g., alkoxy or halogen) bonded thereto and the term silyl-terminated is used to refer to the functional group being positioned at one or both ends of a polymer chain. In certain embodiments of the first-third embodiments, the silyl functional group has a structure as follows: —Si($R^1$)($R^2$)($R^3$) wherein at least one of $R^1$, $R^2$ and $R^3$ (and preferably at least two) comprises a hydrolyzable group selected from alkoxy of C1-C10 (preferably C1-C4), halogen (preferably chlorine), or a combination thereof and the remaining $R^1$, $R^2$, or $R^3$ comprises a hydrocarbyl group (preferably selected from C1-C4 alkyl). In other embodiments of the first-third embodiments, the silyl functional group has a structure as follows: —(W)Si($R^1$)($R^2$)($R^3$) wherein W represents a divalent heteroatom-containing hydrocarbon group (preferably a carbamate), at least one of $R^1$, $R^2$ and $R^3$ (and preferably at least two) comprises a hydrolyzable group selected from alkoxy of C1-C10 (preferably C1-C4), halogen (preferably chlorine), or a combination thereof and the remaining $R^1$, $R^2$, or $R^3$ comprises a hydrocarbyl group (preferably selected from C1-C4 alkyl).

According to the first-third embodiments, the backbone or monomer composition of the silyl-terminated polymer may vary. In certain embodiments of the first-third embodiments, the silyl-terminated polymer comprises a polyether, a polyester, a polyurethane, a polyacrylate, a polyisobutylene, or a combination thereof. In certain embodiments of the first-third embodiments, the silyl-terminated polymer has a molecular weight of about 500 to about 50,000 grams/mole (e.g., 500; 1000; 5000; 10,000; 15,000; 20,000; 25,000; 30,000; 35,000; 40,000; 45,000; or 50,000 grams/mole), 500-50,000 grams/mole, about 1000 to about 35,000 grams/mole, or 1000-35,000 grams/mole; in certain such embodiments, the silyl-terminated polymer comprises a polyether, a polyester, a polyurethane, a polyacrylate, a polyisobutylene, or a combination thereof.

In certain embodiments of the first-third embodiments, the silyl-terminated polymer of the coating composition and/or of the polymer-containing coating comprises a silyl-terminated polyether. In certain embodiments of the first-third embodiments, the only silyl-terminated polymer used in the coating composition or present in the polymer-containing coating is a silyl-terminated polyether. There are various commercially available silyl-terminated polyethers that are suitable for use in certain embodiments of the first-third embodiments including those available from Kaneka Corporation (doing business in the United States as Kaneka North America LLC) under the tradename Kaneka MS Polymer®. Exemplary silyl-terminated polyethers from Kaneka include S227, S303, S303H, S327, and SAX350. Other commercially available silyl-terminated polyethers suitable for use in certain embodiments of the first-third embodiments include those available from Wacker Chemical AG (doing business in the United States as Wacker Chemical Corporation) under the tradename Geniosil® including Geniosil® STP-E 35 (trimethoxysilyl-propyl-carbamate-terminated polyether) and STP-E 30 (dimethoxy(methyl)silylmethylcarbamate-terminated polyether). In certain embodiments of the first-third embodiments, the silyl-terminated polyether has a viscosity of about 5 to about 40 (e.g., 5, 10, 15, 20, 25, 30, 35, or 40) cps×$10^3$ (measured at 23° C.), 5-40 cps×$10^3$ (measured at 23° C.), about 5 to about 30 cps×$10^3$ (measured at 23° C.), 5-30 cps×$10^3$ (measured at 23° C.), about 5 to about 20 cps×$10^3$ (measured at 23° C.), 5-20 cps×$10^3$ (measured at 23° C.), about 5 to about 15 cps×$10^3$ (measured at 23° C.), or 5-15 cps×$10^3$ (measured at 23° C.).

In certain embodiments of the first-third embodiments, the silyl-terminated polymer of the coating composition and/or of the polymer-containing coating comprises a silyl-terminated polyurethane. In certain embodiments of the first-third embodiments, the only silyl-terminated polymer used in the coating composition or present in the polymer-containing coating is a silyl-terminated polyurethane. There are various commercially available silyl-terminated polyurethane that are suitable for use in certain embodiments of the first-third embodiments including those available from Momentive Performance Materials Inc. under their SPUR⁺ tradename (e.g., SPUR⁺ 1050MM, SPUR⁺ 1015LM). In certain embodiments of the first-third embodiments, the silyl-terminated polyurethane has a viscosity of about 30 to about 60 cps×$10^3$ (measured at 25 C), 30-60 cps×$10^3$ (measured at 25 C), about 35 to about 50 cps×$10^3$ (measured at 25 C), 30-60 cps×$10^3$ (measured at 25 C).

In certain embodiments of the first-third embodiments, the silyl-terminated polymer of the coating composition and/or of the polymer-containing coating comprises a silyl-terminated polyester. In certain embodiments of the first-third embodiments, the only silyl-terminated polymer used in the coating composition or present in the polymer-containing coating is a silyl-terminated polyester. In certain embodiments of the first-third embodiments, the silyl-terminated polyester has a silyl group or groups as discussed above with a backbone comprising —O—CO—$R^a$—CO—O—$R^b$— or —$R^c$—CO—O— repeat units, wherein $R^a$, $R^b$ and $R^c$ are divalent organic groups such as straight or branched alkylene groups.

In certain embodiments of the first-third embodiments, the silyl-terminated polymer of the coating composition and/or of the polymer-containing coating comprises a silyl-terminated polyacrylate. In certain embodiments of the first-third embodiments, the only silyl-terminated polymer used in the coating composition or present in the polymer-containing coating is a silyl-terminated polyacrylate. Silyl-terminated polyacrylates may be available from Kaneka Corporation (doing business in the United States as Kaneka North America LLC).

In certain embodiments of the first-third embodiments, the silyl-terminated polymer of the coating composition and/or of the polymer-containing coating comprises a silyl-terminated polyisobutylene. In certain embodiments of the first-third embodiments, the only silyl-terminated polymer used in the coating composition or present in the polymer-containing coating is a silyl-terminated polyisobutylener. Silyl-terminated polyisobutylenes may be available from Kaneka Corporation (doing business in the United States as Kaneka North America LLC)

According to the first-third embodiments, the amount of silyl-terminated polymer or polymers used in the coating composition or present in the polymer-containing coating may vary. In certain embodiments of the first-third embodiments, the coating composition and/or the polymer-containing coating comprises about 5 to about 75% (e.g., 5%, 10%, 15%, 20%, 25%, 30%, 35%, 40%, 45%, 50%, 55%, 60%, 65%, 70%, or 75%) or 5-75% by weight of silyl-terminated polymer or polymers (based upon the total weight of the coating composition used to treat the lower surface of the inner liner or based upon the total weight of the polymer-containing coating). In other embodiments of the first-third embodiments, the coating composition and/or the polymer-containing coating comprises about 25 to about 70% (e.g., 25%, 30%, 35%, 40%, 45%, 50%, 55%, 60%, 65%, or 70%), 25-70%, 40 to about 60% (e.g., 40%, 42%, 45%, 47%, 50%, 52%, 55%, 57%, or 60%) or 40-60% by weight of silyl-terminated polymer or polymers (based upon the total weight of the coating composition used to treat the lower surface of the inner liner or based upon the total weight of the polymer-containing coating). The foregoing amounts and ranges of silyl-terminated polymer should be understood to apply to the various specific types of silyl-terminated polymers discussed above and when more than one such polymer is present the amounts refer total amount of all such polymers.

Plasticizer

As discussed above, according to the first-third embodiments, the coating composition and/or the polymer-containing coating optionally comprises (includes) at least one plasticizer. In other words, in certain embodiments of the first-third embodiments, at least one plasticizer is present in the coating composition and/or the polymer-containing coating and in other embodiments no plasticizer is present. In those embodiments where plasticizer is present, one or more than one plasticizer may be utilized and the amount and composition of such plasticizer(s) may vary as discussed below. When more than one plasticizer is utilized, the amounts referred to herein are to the total amount of all plasticizers, unless indicated to the contrary. The term plasticizer is used herein to refer to an ingredient which when added to an exemplary coating composition reduces the viscosity of that composition.

In those embodiments of the first-third embodiments wherein the coating composition and/or the polymer-containing coating comprises (includes) at least one plasticizer, the amount of plasticizer(s) utilized may vary. In certain embodiments of the first-third embodiments, the coating composition and/or the polymer-containing coating comprises (includes) at least one plasticizer in an amount of about 5 to about 40% (e.g., 5%, 10%, 15%, 20%, 25%, 30%, 35%, or 40%) by weight or 5-40% by weight (based upon the total weight of the coating composition used to treat the lower surface of the inner liner or based upon the total weight of the polymer-containing coating). In certain embodiments of the first-third embodiments, the coating composition and/or the polymer-containing coating comprises (includes) at least one plasticizer in an amount of about 5 to about 20% (e.g., 5%, 6%, 7%, 8%, 9%, 10%, 11%, 12%, 13%, 14%, 15%, 16%, 17%, 18%, 19%, 20%) by weight or 5-20% by weight (based upon the total weight of the coating composition used to treat the lower surface of the inner liner or based upon the total weight of the polymer-containing coating). In other embodiments of the first-third embodiments, the coating composition and/or the polymer-containing coating comprises (includes) at least one plasticizer in an amount of about 20 to about 40% (e.g., 20%, 22%, 25%, 27%, 30%, 32%, 35%, 37%, 40%) by weight or 20-40% by weight (based upon the total weight of the coating composition used to treat the lower surface of the inner liner or based upon the total weight of the polymer-containing coating).

In certain embodiments of the first-third embodiments wherein a plasticizer is utilized in the coating composition or is present in the polymer-containing coating, the plasticizer comprises a phthalate, a dibenzoate, a fatty acid alkyl ester, an epoxidized plant oil, or a combination thereof.

In certain embodiments of the first-third embodiments wherein a plasticizer is utilized in the coating composition or is present in the polymer-containing coating, the plasticizer comprises a phthalate. In certain embodiments of the first-third embodiments wherein a plasticizer is utilized in the coating composition or is present in the polymer-containing coating, the only plasticizer utilized is one or more phthalates. A phthalate is a diester of phthalic acid. According to the first-third embodiments, the structure of the organic groups which replace the two hydrogens in phthalic acid may vary and include, but are not limited to alkyl groups of C4 to about C13 (including C6 to C12) and aryl of C6 to C20 (including C6 to C12); the two organic groups may be the same or different. In certain embodiments of the first-third embodiments, the plasticizer comprises at least one phthalate selected from diisononyl phthalate, di-2-ethylhexyl-phthalate, dioctyl phthalate, butylbenzylphthalate, diisodecyl phthalate, di-n-hexyl phthalate, dibutyl phthalate, or dipropylheptyl phthalate.

In certain embodiments of the first-third embodiments wherein a plasticizer is utilized in the coating composition or is present in the polymer-containing coating, the plasticizer comprises a dibenzoate. Generally, a dibenzoate refers to a compound formed by esterification of two molar equivalents of benzoic acid with a glycol (e.g., diethylene glycol or dipropylene glycol). In certain embodiments of the first-third embodiments wherein a plasticizer is utilized in the coating composition or is present in the polymer-containing coating, the only plasticizer utilized is one or more dibenzoates. In certain embodiments of the first-third embodiments wherein a plasticizer is utilized in the coating composition or is present in the polymer-containing coating, the only plasticizer utilized is a combination of one or more dibenzoates with one or more other plasticizers as discussed herein. In certain embodiments of the first-third embodiments, the plasticizer comprises at least one dibenzoate selected from diethylene glycol dibenzoate, dipropylene glycol dibenzoate, ethylene glycol dibenzoate, propylene glycol dibenzoate, or a combination thereof.

In certain embodiments of the first-third embodiments wherein a plasticizer is utilized in the coating composition or is present in the polymer-containing coating, the plasticizer comprises a fatty acid alkyl ester. In certain embodiments of the first-third embodiments wherein a plasticizer is utilized in the coating composition or is present in the polymer-containing coating, the only plasticizer utilized is one or more fatty acid alkyl esters. In certain embodiments of the first-third embodiments, the fatty acid alkyl ester is non-epoxidized (i.e., the fatty acid chain is not epoxidized). In other embodiments of the first-third embodiments, the fatty acid alkyl ester is epoxidized (i.e., the fatty acid chain is epoxidized). In certain embodiments of the first-third embodiments, the fatty acid alkyl ester has the formula $R^e C(=O)OR^f$ wherein $R^e$ is a liner or branched alkyl of C1 to C10 and $R^f$ is a saturated, mono-unsaturated, or poly-unsaturated fatty acid chain of C8 to C22 (optionally epoxidized). In certain embodiments of the first-third embodiments, the plasticizer comprises a fatty acid alkyl ester comprising a soy methyl ester.

In certain embodiments of the first-third embodiments wherein a plasticizer is utilized in the coating composition or is present in the polymer-containing coating, the plasticizer comprises an epoxidized plant oil. One or more than one epoxidized plant oil may be utilized. In certain embodiments of the first-third embodiments wherein a plasticizer is utilized in the coating composition or is present in the polymer-containing coating, the only plasticizer utilized is one or more epoxidized plant oils. In certain embodiments of the first-third embodiments, the plasticizer comprises at least one epoxidized version of one or more of the following plant oils: soy or soybean oil, sunflower oil (including high oleic sunflower oil having an oleic acid content of at least 60%, at least 70% or at least 80%), safflower oil, corn oil, linseed oil, cotton seed oil, rapeseed oil, cashew oil, sesame oil, *camellia* oil, jojoba oil, macadamia nut oil, coconut oil, and palm oil.

Tackifier

As discussed above, according to the first-third embodiments, the coating composition and the polymer-containing coating comprises (includes) at least one tackifier. One or more than one tackifier may be utilized. As used herein, the term tackifier encompasses hydrocarbons resins (e.g., natural resins, synthetic resins, and combinations thereof) as well as low molecular weight polymer or oligomers (e.g., having a weight average molecular weight or Mw of 100,000 grams/mole or less, preferably 50,000 grams/mole or less). Mw and Mn values referred to herein can be determined by gel permeation chromatography (GPC) calibrated with polystyrene standards. The use of at least one tackifier in the coating composition will result in the presence of tackifier in the polymer-containing coating. In certain embodiments of the first-third embodiments, the coating composition and/or polymer-containing coating further comprise (contain) at least one tackifier. One or more than one tackifier may be utilized.

According to the first-third embodiments, the amount of tackifier utilized in the coating composition or present in the polymer-containing coating may vary. In certain embodiments of the first-third embodiments, the coating composition and/or the polymer-containing coating comprises at least one tackifier in an amount of about 5 to about 25% by weight (e.g., 5%, 7%, 10%, 12%, 15%, 17%, 20%, 22%, or 25% by weight), 5-25% by weight, about 5 to about 20% by weight, 5-20% by weight, about 5 to about 15% by weight, or 5-15% by weight (based upon the total weight of the coating composition or based upon the total weight of the polymer-containing coating). When more than one tackifier is utilized, the foregoing amounts should be understood to refer to the total amount of all tackifiers.

In certain embodiments of the first-third embodiments, the coating composition and/or polymer-containing coating comprises at least one hydrocarbon resin comprising a natural resin. In certain embodiments of the first-third embodiments, the only tackifier is one or more hydrocarbon resins in the form of natural resin. In certain embodiments of the first-third embodiments, the coating composition and/or polymer-containing coating comprises at least one hydrocarbon resin comprising a synthetic resin. By synthetic resin is meant a polymerized form of a resin wherein the polymerization does not occur in nature but occurs by manufacturing, although the monomer(s) that are polymerized may be naturally-occurring. In certain embodiments of the first-third embodiments, the only hydrocarbon resin or resins are synthetic resins. According to the first-third embodiments, when at least one hydrocarbon resin is utilized (as tackifier) in the coating composition and/or present in the polymer-containing coating the amount utilized may vary. In certain embodiments of the first-third embodiments, the coating composition and/or polymer-containing coating comprises about 5 to about 25% by weight (e.g., 5%, 7%, 10%, 12%, 15%, 17%, 20%, 22%, or 25% by weight), 5-25% by weight, about 5 to about 20% by weight, 5-20% by weight, about 5 to about 15% by weight, or 5-15% by weight (based upon the total weight of the coating composition or based upon the total weight of the polymer-containing coating) of the at least one hydrocarbon resin as tackifier.

In certain embodiments of the first-third embodiments, the coating composition and/or polymer-containing coating comprises at least one tackifier in the form of a hydrocarbon resin wherein the hydrocarbon resin comprises at least one of a/an: aliphatic resin, hydrogenated aliphatic resin, cycloaliphatic resin, hydrogenated cycloaliphatic resin, aromatic resin, hydrogenated aromatic resin, terpene resin, aliphatic/aromatic resin, or rosin resin. According to the first-third embodiments, the at least one hydrocarbon resin can be a combination of the foregoing types of resins (e.g., an aliphatic/aromatic resin contains both an aliphatic and an aromatic component) and, thus, a particular hydrocarbon resin may be considered to fall within more than one category.

In certain embodiments of the first-third embodiments, the coating composition and/or polymer-containing coating comprises (as tackifier) at least one hydrocarbon resin comprising an aliphatic resin, optionally in combination with one or more of the foregoing resins (e.g., cycloaliphatic, hydrogenated cycloaliphatic, aromatic, hydrogenated aromatic, terpene, rosin) and/or optionally partially or fully hydrogenated. Non-limiting examples of aliphatic resins suitable for use as a tackifier in the coating composition and/or polymer-containing coating of certain embodiments of the first-third embodiments include C5 fraction homopolymer or copolymer resins. Non-limiting examples of aliphatic copolymer resins include C5 fraction/C9 fraction copolymer resins, C5 fraction/vinylaromatic copolymer resins (e.g., C5 fraction/styrene copolymer resin), and C9 fraction copolymer resins. In certain embodiments of the first-third embodiments when the tackifier comprises an aliphatic resin, it is partially or fully hydrogenated. In those embodiments of the first-third embodiments, wherein the at least one tackifier includes an aliphatic resin, such resin can be used in the amounts discussed above for the tackifier.

In certain embodiments of the first-third embodiments, the coating composition and/or polymer-containing coating comprises (as tackier) at least one hydrocarbon resin comprising a cycloaliphatic resin, optionally in combination with one or more of the foregoing resins (e.g., aliphatic, hydrogenated aliphatic, aromatic, hydrogenated aromatic, terpene, rosin) and/or optionally partially or fully hydrogenated. Non-limiting examples of cycloaliphatic resins suitable for use as a tackifier in the coating composition and/or polymer-containing coating of certain embodiments of the first-third embodiments include cyclopentadiene ("CPD") homopolymer or copolymer resins, and dicyclopentadiene ("DCPD") homopolymer or copolymer resins. Non-limiting examples of cycloaliphatic copolymer resins include CPD/vinyl aromatic copolymer resins, DCPD/vinyl aromatic copolymer resins, CPD/terpene copolymer resins, DCPD/terpene copolymer resins, CPD/aliphatic copolymer resins (e.g., CPD/C5 fraction copolymer resins), DCPD/aliphatic copolymer resins (e.g., DCPD/C5 fraction copolymer resins), CPD/aromatic copolymer resins (e.g., CPD/C9 fraction copolymer resins), DCPD/aromatic copolymer resins (e.g., DCPD/C9 fraction copolymer resins), CPD/vinyl aromatic copolymer resins (e.g., CPD/styrene copolymer resins), DCPD/vinyl aromatic copolymer resins (e.g., DCPD/styrene copolymer resins), CPD/terpene copolymer resins (e.g., limonene/CPD copolymer resin), and DCPD/terpene copolymer resins (e.g., limonene/DCPD copolymer resins). In certain embodiments of the first-third embodiments when the tackifier comprises a cycloaliphatic resin, it is partially or fully hydrogenated. In those embodiments of the first-third embodiments, wherein the at least one tackifier includes a cycloaliphatic resin, such resin can be used in the amounts discussed above for the tackifier.

In certain embodiments of the first-third embodiments, the coating composition and/or polymer-containing coating comprises (as tackifier) at least one hydrocarbon resin comprising an aromatic resin, optionally in combination with one or more of the foregoing resins (e.g., aliphatic, hydrogenated aliphatic, cycloaliphatic, hydrogenated cycloaliphatic, hydrogenated aromatic, terpene, rosin) and/or optionally partially or fully hydrogenated. Non-limiting examples of aromatic resins suitable for use as a tackifier in the coating composition and/or polymer-containing coating of certain embodiments of the first-third embodiments include coumarone-indene resins, phenolic resins (e.g., resol-type and novolak-type such as can be obtained by condensation reactions of phenolic compounds such as phenol, cresol, xylenol, resorcinol, alkyl-phenol, or modified phenols with aldehyde compounds such as formaldehyde and paraformaldehyde), nitrogen-containing phenolic resins (such as can be obtained by condensation reaction of the above-mentioned phenolic compounds and aldehyde compounds in the presence of a nitrogen-containing catalyst such as ammonia or an amine compound), and alkyl-phenol resins as well as vinyl aromatic homopolymer or copolymer resins such as those including one or more of the following monomers: alpha-methylstyrene, styrene, ortho-methylstyrene, meta-methylstyrene, para-methylstyrene, vinyltoluene, para(tert-butyl)styrene, methoxystyrene, chlorostyrene, hydroxystyrene, vinylmesitylene, divinylbenzene, vinylnaphthalene or any vinyl aromatic monomer resulting from C9 fraction or C8-C10 fraction. Non-limiting examples of vinylaromatic copolymer resins include vinylaromatic/terpene copolymer resins (e.g., limonene/styrene copolymer resins), vinylaromatic/C5 fraction resins (e.g., C5 fraction/styrene copolymer resin), vinylaromatic/aliphatic copolymer resins (e.g., CPD/styrene copolymer resin, and DCPD/styrene copolymer resin). Non-limiting examples of alkyl-phenol resins include alkylphenol-acetylene resins such as p-tert-butylphenol-acetylene resins, alkylphenol-formaldehyde resins (such as those having a low degree of polymerization). In certain embodiments of the first-third embodiments when the tackifier comprises an aromatic resin, it is partially or fully hydrogenated. In those embodiments of the first-third embodiments, wherein the at least one tackifier includes an aromatic resin, such resin can be used in the amounts discussed above for the tackifier.

In other embodiments of the first-third embodiments, the coating composition and polymer-containing coating are devoid or substantially devoid of any aromatic resin. In other embodiments of the first-third embodiments, the coating composition and polymer-containing coating are devoid or substantially devoid of any phenolic-type aromatic resin. In other embodiments of the first-third embodiments, the coating composition and polymer-containing coating are devoid or substantially devoid of any phenol-formaldehyde-type aromatic resin. By devoid is meant 0% by weight. By substantially devoid is meant no more than 1% by weight and includes no more than 0.5% by weight.

In certain embodiments of the first-third embodiments, the coating composition and/or polymer-containing coating comprises (as tackifier) at least one hydrocarbon resin comprising a terpene resin, optionally in combination with one or more of the foregoing resins (e.g., aliphatic, cycloaliphatic, aromatic, hydrogenated aromatic) and/or optionally partially or fully hydrogenated. Non-limiting examples of terpene resins suitable for use as a tackifier in the coating composition and/or polymer-containing coating of certain embodiments of the first-third embodiments include alpha-pinene resins, beta-pinene resins, limonene resins (e.g., L-limonene, D-limonene, dipentene which is a racemic mixture of L- and D-isomers), beta-phellandrene, delta-3-carene, and delta-2-carene; in certain embodiments of the first-third embodiments, the terpene resin is a terpene copolymer resin comprising at least one of the foregoing terpenes in combination with one or more of the foregoing resins (e.g., aliphatic, hydrogenated aliphatic, cycloaliphatic, hydrogenated cycloaliphatic, aromatic, hydrogenated aromatic, rosin). An exemplary homopolymer terpene resin is polylimonene. Non-limiting examples of terpene copolymer resins include aliphatic/terpene resins (e.g., DCPD/terpene copolymer resins, and CPD/terpene copolymer resins), terpene/phenol copolymer resins, terpene/vinylaromatic copolymer resins (e.g., limonene/styrene copolymer resins). In certain embodiments of the first-third embodiments, when a terpene resin is utilized, its source may be guayule resin, and, thus, the terpene resin may be considered to be guayule resin or guayule terpene resin. In those embodiments of the first-third embodiments, wherein the at least one tackifier includes a terpene resin, such resin can be used in the amounts discussed above for the tackifier.

In certain embodiments of the first-third embodiments, the coating composition and/or polymer-containing coating comprises (as tackifier) at least one hydrocarbon resin comprising a rosin resin, optionally in combination with one or more of the foregoing resins (e.g., aliphatic, hydrogenated aliphatic, cycloaliphatic, hydrogenated cycloaliphatic, aromatic, hydrogenated aromatic, terpene) and/or optionally partially or fully hydrogenated. Non-limiting examples of rosin resins suitable for use as a tackifier in the coating composition and/or the polymer-containing coating of certain embodiments of the first-third embodiments include gum rosin, wood rosin, and tall oil rosin. Non-limiting examples of modified rosin resins include glycerin ester rosins, and pentaerythritol ester rosins (optionally partially hydrogenated and/or polymerized). In those embodiments of the first-third embodiments, wherein the at least one tackifier includes a rosin resin, such resin can be used in the amounts discussed above for the tackifier.

In certain embodiments of the first-third embodiments, the coating composition and/or polymer-containing coating comprises at least one tackifier comprising a low molecular weight polymer or oligomer. In certain embodiments of the first-third embodiments, the only hydrocarbon resin or resins are low molecular weight polymers or oligomers. In certain embodiments of the first-third embodiments, the coating composition and/or polymer-containing coating comprises about 5 to about 25% by weight (e.g., 5%, 7%, 10%, 12%, 15%, 17%, 20%, 22%, or 25% by weight), 5-25% by weight, about 5 to about 20% by weight, 5-20% by weight, about 5 to about 15% by weight, or 5-15% by weight (based upon the total weight of the coating composition or based upon the total weight of the polymer-containing coating) of at least one low molecular weight polymer or oligomer as tackifier. In certain embodiments of the first-third embodiments, the coating composition and/or polymer-containing coating comprises at least one low molecular weight polymer or oligomer having a Mw of about 700 to about 50,000 grams/mole (e.g., 700 grams/mole; 750 grams/mole; 1000 grams/mole; 2500 grams/mole; 5000 grams/mole; 7500 grams/mole; 10000 grams/mole; 15,000 grams/mole; 20,000 grams/mole; 25,000 grams/mole; 30,000 grams/mole; 35,000 grams/mole; 40,000 grams/mole; 45,000 grams/mole; 50,000 grams/mole), including 1000-50,000 grams/mole; 1000-40,000 grams/mole; 1000-25,000 grams/mole; 1000-15000 grams/mole; 1000-10.00 grams/mole; 1000-7500 grams/mole; 1000-5000 grams/mole. In certain embodiments of the first-third embodiments, the coating composition and/or polymer-containing coating comprises at least one low molecular weight polymer or oligomer having a Mn of about 500 to about 40,000 grams/mole (e.g., 500 grams/mole; 600 grams/mole; 750 grams/mole; 1000 grams/mole; 3000 grams/mole; 5000 grams/mole; 7500 grams/mole; 10,000 grams/mole; 15,000 grams/mole; 20,000 grams/mole; 25,000 grams/mole; 30,000 grams/mole; 35,000 grams/mole; 40,000 grams/mole), including 750-40,000 grams/mole; 750-25,000 grams/mole; 750-15,000 grams/mole; 750-10,000 grams/mole; 750-5000 grams/mole; and 750-3000 grams/mole.

In certain embodiments of the first-third embodiments, the coating composition and/or polymer-containing coating comprises at least one tackifier comprising polybutene. Exemplary polybutenes for use as a tackifier include, but are not limited to, Indopol® polybutenes from Ineos Oligomers (League City, Texas) as grades H-100, H-300, H-1500, or H-1900. In those embodiments of the first-third embodiments, wherein the at least one tackifier includes a polybutene, the polybutene can be used in the amounts discussed above for the tackifier.

In certain embodiments of the first-third embodiments, the coating composition and/or polymer-containing coating comprises at least one low molecular weight polymer or oligomer comprised of aliphatic monomer(s), aromatic monomer(s), or a combination thereof. One of more of each type of monomer may be used, as well as combinations thereof. The aliphatic monomer may be a linear, branched or cycloaliphatic monomer. Exemplary aliphatic monomers include: C4 paraffins, C5 paraffins, C6 parafins, olefins, conjugated dienes, and combinations thereof. More specific examples of aliphatic monomers include: 1,3-butadiene; butene; isobutylene; 1,3-pentadiene; 1,4-pentadiene; cyclopentane; 1-pentene; 2-pentene; 2-methyl-1-pentene; 2-methyl-2-butene; 2-methyl-2-pentene; isoprene; cyclohexane; 1,3-hexadiene; 1,4-hexadiene; cyclopentadiene; dicyclopentadiene; and combinations thereof. The aromatic monomer may be optionally substituted with one or more hydrocarbon groups. Exemplary aromatic monomers include: styrene, indene, C8 aromatics, C9 aromatics; C10 aromatics; and combinations thereof. In those embodiments of the first-third embodiments, wherein the at least one tackifier includes at least one low molecular weight polymer or oligomer comprised of aliphatic monomer(s), aromatic monomer(s), or a combination thereof, such polymer or oligomer can be used in the amounts discussed above for the tackifier.

Adhesion Promoter

As discussed above, according to the first-third embodiments, the coating composition and/or the polymer-containing coating comprises (includes) at least one adhesion promoter. One or more than one adhesion promoter may be utilized and the amount and composition of such adhesion promoter(s) may vary as discussed below. The term adhesion promoter is used herein to refer to a non-polymeric (having less than ten repeat units) silicon-containing hydrocarbon compound having a lower molecular weight than the silyl-terminated polymer. Generally, the adhesion promoter is capable of interacting with both the silyl-terminated polymer and the rubber or elastomer of the inner liner surface to which the coating composition is applied. In certain embodiments of the first-third embodiments, the adhesion promoter comprises a bifunctional silane which is a silicon-containing compound having at least one hydrolyzable group (e.g., alkoxy or halogen) and at least one moiety or functionality that binds to the elastomer of the inner liner surface (e.g., mercapto, amino, vinyl, epoxy, sulfur-containing group). In certain embodiments of the first-third embodiments, the at least one adhesion promoter is selected from mercaptosilanes; blocked mercaptosilanes; bis(trialkoxysilylorgano)polysulfides (e.g., bis(trialkoxysilylorgano) disulfides and bis(trialkoxysilylorgano)tetrasulfides); aminosilanes such as trialkoxyaminosilanes (e.g., wherein the alkoxy comprises methoxy, ethoxy, etc.), alkyldialkoxyaminosilanes (e.g., where the alkoxy comprises methoxy, ethoxy, etc. and the alkyl comprises methyl, ethyl, etc.), and aminoorganofunctional silanes wherein the amino group is separated from the silicon atom by multiple methylene groups (e.g., gamma-aminopropyltrimethoxysilane, gamma-aminopropyltriethoxysilane, gamma-(aminoethyl)-aminopropyltrimethoxy-silane, methylaminopropyldimethoxysilane, methyl-gamma-(aminoethyl)-aminopropyldimethoxysilane, gamma-dimethylaminopropyltrimethoxysilane).

According to the first-third embodiments, the amount of adhesion promoter that is utilized in the coating composition and/or is present in the polymer-containing coating may vary. In certain embodiments of the first-third embodiments, the at least one adhesion promoter is present in an amount of about 1 to about 10% by weight (e.g., 1%, 2%, 3%, 4%, 5%, 6%, 7%, 8%, 9%, or 10%), 1-10% by weight, about 2 to about 8% by weight, or 2-8% by weight (based upon the total weight of the coating composition used to treat the lower surface of the inner liner or based upon the total weight of the polymer-containing coating).

Moisture Scavenger

As discussed above, according to the first-third embodiments, the coating composition and/or the polymer-containing coating optionally comprises (includes) at least one moisture scavenger. In other words, in certain embodiments of the first-third embodiments, at least one moisture scavenger is present in the coating composition and/or the polymer-containing coating and in other embodiments no moisture scavenger is present. In those embodiments where moisture scavenger is present, one or more than one such compound may be utilized and the amount and composition of such moisture scavenger(s) may vary as discussed below. When more than one moisture scavenger is utilized, the amounts referred to herein are to the total amount of all moisture scavenger, unless indicated to the contrary. The term moisture scavenger is used herein to refer to a compound capable of adsorbing (chemically, physically, or a combination thereof) moisture which could otherwise compromise the properties of the coating composition or render it unusable. The decision of whether or not to utilize a moisture scavenger in the coating composition may depend upon the storage conditions (e.g., temperature, time, humidity) of the coating composition. The use of at least one moisture scavenger in the coating composition may extend the shelf-life of the coating composition, rendering it usable for a relatively longer period of time in the methods of the first and second embodiments as compared to a coating composition lacing any moisture scavenger.

In certain embodiments of the first-third embodiments, wherein a moisture scavenger is utilized, the at least one moisture scavenger comprises at least one of the following: a vinyl alkoxysilane, an alkyltrialkoxysilane, an oxadolidine, calcium oxide, anhydrous silica, anhydrous sodium sulfate, anhydrous calcium sulfate, or zeolites. Various commercially available moisture scavengers according to the foregoing exist including, but not limited to, Type 3A molecular sieves from UOP Honeywell (a zeolite having 3 Angstrom pores).

In those embodiments of the first-third embodiments wherein at least one moisture scavenger is utilized, the amount utilized in the coating composition or present in the polymer-containing coating may vary. In certain embodiments of the first-third embodiments, the at least one moisture scavenger is present in an amount of about 0.5 to about 5% by weight (e.g., 0.5%, 1%, 1.5%, 2%, 2.5%, 3%, 3.5%, 4%, 4.5%, or 5%), 0.5-5% by weight, about 1 to about 3% by weight, or 1-3% by weight (based upon the total weight of the coating composition used to treat the lower surface of the inner liner or based upon the total weight of the polymer-containing coating).

Catalyst

As discussed above, according to the first-third embodiments, the coating composition and/or the polymer-containing coating comprises (includes) at least one catalyst. One or more than one catalyst may be utilized and the amount and composition of such catalyst(s) may vary as discussed below. Generally, the catalyst promotes crosslinking of the silyl-terminated polymer and can be understood as contributing to the curing of the coating composition used in the methods of the first and second embodiments disclosed herein. Without being bound by theory, it is believed that the catalyst promotes hydrolysis and condensation of organo-silicon compounds (i.e., reactions between the terminal groups of the silyl-terminated polymer, and reactions between the adhesion promoter and the silyl-terminated polymer). In certain embodiments of the first-third embodiments, the catalyst may be one or more basic compounds. In other embodiments of the first-third embodiments, the catalyst may be one or more acidic compounds.

In certain embodiments of the first-third embodiments, the catalyst comprises at least one acidic compound selected from mineral acids, organic acids, Lewis acids, organotin compounds, or titanium compounds. Exemplary mineral acids include sulfuric acid, phosphoric acid, and hydrochloric acid. Exemplary organic acids include acetic acid, formic acid, propionic acid, malic acid, citric acid, oxalic acid, lactic acid, methane sulfonic acid, butyric acid, valeric acid, aconitic acid, caproic acid, hexanoic acid, and heptanoic acid. Exemplary Lewis acids include those based upon the following metals: aluminum, boron, silicon, and tin, titanium, zirconium, iron, copper, or zinc in combination with oxygen, nitrogen, sulfur or halogen. Non-limiting specific examples of Lewis acids include aluminum chloride, tin tetrachloride, boron trifluoride and titanium tetrachloride. Exemplary organotin compounds include diorgano tin dicarboxylates (e.g., dibutyl tin dilaurate,) and stannous octate. Exemplary titanium compounds include alkyl ortho esters such as tetrabutyl titanate which is a tetraortho ester of titanium.

In certain embodiments of the first-third embodiments, the catalyst comprises at least one basic compound selected from alkali metal hydroxides, silanolates, organic amines, or Lewis bases (e.g., alkali metal carbonates, alkali metal bicarbonates). Exemplary alkali metal hydroxides include potassium hydroxide and sodium hydroxide. Exemplary silanolates include sodium silanolate, potassium silanolate, lithium silanolate, and tetramethylammonium silanoate. Exemplary organic amines include methylamine, ethylamine, cyclohexylamine, aniline, and phenyl diamine. Exemplary Lewis bases include alkali metal carbonates (e.g., sodium carbonate, potassium carbonate) and alkali metal dicarbonates (e.g., sodium bicarbonate, potassium bicarbonate).

According to the first-third embodiments, the amount of catalyst that is utilized in the coating composition and/or is present in the polymer-containing coating may vary. In certain embodiments of the first-third embodiments, the at least one catalyst is present in an amount of about 0.1 to about 5% by weight (e.g., 0.1%, 0.5%, 1%, 1.5%, 2%, 2.5%, 3%, 3.5%, 4%, 4.5%, or 5%), 0.1-5% by weight, about 0.1 to about 4% by weight, 0.1-4% by weight, about 0.1 to about 3% by weight, 0.1-3% by weight, about 0.1 to about 2% by weight, 0.1-2% by weight, about 0.5 to about 2% by weight, or 0.5-2% by weight (based upon the total weight of the coating composition used to treat the lower surface of the inner liner or based upon the total weight of the polymer-containing coating). In those embodiments of the first-third embodiments wherein more than one catalyst is utilized or present, the foregoing amounts should be understood as referring to the total amount of all catalysts.

Antioxidant

As discussed above, according to the first-third embodiments, the coating composition and/or the polymer-containing coating optionally comprises (includes) at least one antioxidant. In other words, in certain embodiments of the first-third embodiments, at least one antioxidant is present in the coating composition and/or the polymer-containing coating and in other embodiments no antioxidant is present. In those embodiments where antioxidant is present, one or more than one such compound may be utilized and the amount and composition of such antioxidant(s) may vary as discussed below.

In certain embodiments of the first-third embodiments, the at least one antioxidant comprises a hindered phenol, a hindered amine, a catechol, a phosphate ester, or a combination thereof. Preferably any antioxidant utilized is non-volatile.

In those embodiments of the first-third embodiments wherein at least one antioxidant is utilized, the amount utilized in the coating composition or present in the polymer-containing coating may vary. In certain embodiments of the first-third embodiments, the at least one antioxidant is present in an amount of about 0.1 to about 3% by weight (e.g., 0.1%, 0.5%, 1%, 1.5%, 2%, 2.5%, or 3%), 0.1-3% by weight, about 0.1 to about 2% by weight, 0.1-2% by weight, about 0.5 to about 2% by weight, or 0.5-2% by weight (based upon the total weight of the coating composition used to treat the lower surface of the inner liner or based upon the total weight of the polymer-containing coating). In those embodiments of the first-third embodiments wherein more than one antioxidant is utilized or present, the foregoing amounts should be understood as referring to the total amount of all antioxidants.

Thixotrope

In certain embodiments of the first-third embodiments, the coating composition and/or the polymer-containing coating further comprises (includes) at least one thixotrope. In other words, in certain embodiments of the first-third embodiments, at least one thixotrope is present in the coating composition and/or the polymer-containing coating and in other embodiments no thixotrope is present. Generally, the thixotrope will reduce the viscosity of the coating composition when stress is applied (e.g., making the coating composition more liquid during stirring). In those embodiments where a thixotrope is present, one or more than one such compound may be utilized and the amount and composition of such thixotrope(s) may vary as discussed below. When more than one thixotrope is utilized, the amounts referred to herein are to the total amount of all thixotropes, unless indicated to the contrary.

In certain embodiments of the first-third embodiments, the at least one thixotrope comprises a polyamide wax, a polymerized castor oil, or a combination thereof. Exemplary polyamide waxes include those available from Arkema Coating Resins under the tradename Crayvallac® such as Crayvallac® SLX micronized amide wax. Exemplary polymerized castor oils include those available from Total Cray Valley under the tradename Flowtone such as Flowtone®.

In those embodiments of the first-third embodiments wherein at least one thixotrope is utilized, the amount utilized in the coating composition or present in the polymer-containing coating may vary. In certain embodiments of the first-third embodiments, the at least one thixotrope is present in an amount of about 0.1 to about 6% (e.g., 0.1%, 0.5%, 1%, 1.5%, 2%, 2.5%, 3%, 3.5%, 4%, 4.5%, 5%, 5.5%, 6%) by weight, 0.1-6% by weight, about 0.5 to about 5% by weight, 0.5-5% by weight, about 0.5 to about 4% by weight, or 0.5-4% by weight (based upon the total weight of the coating composition used to treat the lower surface of the inner liner or based upon the total weight of the polymer-containing coating).

Other Ingredients

In certain embodiments of the first-third embodiments, one or more additional ingredients is included in the coating composition or is present in the polymer-containing composition. Exemplary such additional ingredients include fillers, dyes, pigments, expandable microspheres, expanded microspheres, fibers, and combinations thereof. Examples of suitable fillers include calcium carbonate, starch, clay, talc, titanium dioxide (e.g., non-reinforcing titanium dioxide), carbon black (e.g., non-reinforcing carbon black), graphite, magnesium dioxide, aluminum oxide, boron nitride, silicon nitride, aluminum nitride, calcium silicate, silicon carbide, and combinations thereof. In certain embodiments of the first-third embodiments wherein one or more fillers are utilized, the filler(s) are non-reinforcing fillers. As used herein, the phrase "non-reinforcing filler" refers to a particulate material that has a nitrogen surface area of less than about 20 m2/g (including less than 20 m2/g), and in certain embodiments less than about 10 m2/g (including less than 10 m2/g); reinforcing extenders will have surface areas higher than the foregoing. The nitrogen surface area of particulate extender materials can be determined according to various standard methods (including ASTM D6556 or D3037). In certain embodiments of the third embodiment, the term non-reinforcing extender is additionally or alternatively used to refer to a particulate material that has a particle size of greater than about 1000 nm (including greater than 1000 nm); reinforcing extenders will have particle sizes less than the foregoing. Examples of suitable fibers include cellulosic fibers (e.g., jute, cotton, rayon), natural fibers (e.g., flax, linen, cotton, wool), synthetic fibers (e.g., polyester, nylon, polyolefin, polystyrene, acrylic), graphite fibers, and combinations thereof. In certain embodiments of the first-third embodiments, at least one filler is present in an amount of about 1 to about 50 weight % (e.g., 1%, 5%, 10%, 15%, 20%, 25%, 30%, 35%, 40%, 45%, or 50%) or 1-50 weight %, preferably about 1 to about 30 weight % (based upon the total weight of the coating composition used to treat the lower surface of the inner liner or based upon the total weight of the polymer-containing coating). In other embodiments of the first-third embodiments, any amount of filler utilized is more limited such as no more than 10 weight % (e.g., 10%, 9%, 8%, 7%, 6%, 5%, 4%, 3%, 2%, 1%, or 0%), no more than 5 weight %, no more than 1 weight % or even 0 weight %.

In preferred embodiments of the first-third embodiments, the coating composition (or the polymer-containing coating resulting therefrom) contains a limited amount of solvent (less than 5% by weight, less than 4% by weight, less than 3% by weight, less than 2% by weight, or less than 1% by weight) or is even devoid of solvent (i.e., contains 0% by weight). By solvent is meant a volatile organic compound such as will volatilize at room temperature (23° C.) non-limiting examples of which include methanol and ethanol. In certain embodiments of the first and second embodiments, the coating composition or the polymer-containing coating resulting therefrom has a volatile organic carbon (VOC) content of less than 50 grams/liter, less than 40 grams/liter, less than 30 grams/liter, less than 20 grams/liter, or less than 10 grams/liter (as measured by EPA Method 24).

Polymer-Containing Coating

As discussed above, the methods of the first and second embodiments disclosed herein result in a polymer-containing coating upon the surface of the cured inner liner. Similarly, the cured tire of the third embodiment includes a cured inner liner having a polymer-containing coating upon its lower surface (i.e., the radially inward-facing surface) which can be understood as resulting from the polymer-containing coating. According to the first-third embodiments, the thickness of the polymer-containing coating may vary. In certain embodiments of the first-third embodiment, the polymer-containing coating has a thickness of about 10 to about 1000 micrometers (e.g., 10, 50, 100, 150, 200, 250, 300, 350, 400, 450, 500, 550, 600, 650, 700, 750, 800, 850, 900, 950, 1000 micrometers), 10-1000 micrometers, about 10 to about 500 micrometers, or 10-500 micrometers.

In certain embodiments of the first and second embodiments, after treatment of the lower surface of the cured inner liner with the coating composition, the coating composition is allowed to dry or cure prior to adhering a tire component to the polymer-containing coating upon the radially inward-facing surface of the cured inner liner. Generally, after drying or curing the polymer-containing coating will be non-tacky or non-sticky. In other embodiments of the first and second embodiments, after treatment of the lower surface of the cured inner liner with the coating composition, a tire component is adhered to the polymer-containing coating upon the radially inward-facing surface of the cured inner liner before the coating composition dries or cures. According to the first and second embodiments, the amount of time required for the coating composition to dry or cure may vary. In certain embodiments of the first and second embodiments, the tire component is adhered to the polymer-containing coating upon the radially inward-facing surface of the cured inner liner within minutes (e.g., within 5 minutes, within 10 minutes, within 15 minutes, within 30 minutes, within 45 minutes) after treatment of the lower surface of the cured inner liner with the coating composition. Notably, a time of 5 minutes can be considered to be "within 5 minutes" and also "within 10 minutes" whereas a time of 10 minutes is "within 10 minutes" but is not "within 5 minutes." In other embodiments of the first and second embodiments, the tire component is adhered to the polymer-containing coating upon the radially inward-facing surface of the cured inner liner only after allowing the coating to dry or cure for an hour or more (e.g., 1 hour, 2 hours, 3 hours, 4 hours, 5 hours, 6 hours, 12 hours, 24 hours, or more than 24 hours). In those embodiments of the first and second embodiments wherein the coating composition is allowed to dry or cure prior to adhering a tire component to the polymer-containing upon the radially inward-facing surface of the cured inner liner, it may be preferable to utilize a separate adhesive to achieve sufficient adhesion of the tire component to the inner liner. In certain embodiments of the first and second embodiments wherein the tire component is adhered to the polymer-containing coating upon the radially inward-facing surface of the cured inner liner within minutes, a separate adhesive may be utilized (either upon the tire component or upon the polymer-containing coating) to ensure sufficient adhesion between the tire component and the inner liner; however, in many embodiments no separate adhesive will be necessary since the polymer-containing coating (once dry or cured) will sufficiently adhere the tire component to the inner liner.

In certain embodiments of the first-third embodiments, the lower surface of the cured inner liner comprises a release treatment comprising polysiloxane moieties. Such a release treatment allows for a tire body containing the release treatment upon the lower surface of its inner liner to be cured in a tire mold and pressed against a curing bladder without sticking or co-curing of the inner liner's lower surface to the curing bladder. As discussed in more detail below, when the lower surface of the cured inner liner upon which the polymer-containing coating is produced comprises a release treatment comprising polysiloxane moieties, treatment with the coating composition produces a polymer-containing coating which will generally be tacky or adhesive prior to drying or curing and generally be non-tacky or non-sticky after drying or curing. In certain embodiments of the first-third embodiments, the polymer-containing coating is adhesive (e.g., tacky or sticky) and in other embodiments the polymer-containing coating is non-adhesive. In certain embodiments of the first-third embodiments, a polymer-containing coating that is non-adhesive may also be considered to be an adhesion film which increases the adherability of the lower surface of the cured inner liner. By adherability is meant the ability of other materials to adhere to the lower surface of the cured inner liner. Preferably, the non-adhesive film or adhesion film is capable of having a separate adhesive (e.g., a PSA) adhered to it. Notably, when the lower surface of the cured inner liner comprises a release treatment comprising polysiloxane moieties (i.e., prior to treatment with the coating composition), the lower surface is not capable of having a separate adhesive (e.g., a PSA) adhere to it. Thus, in such embodiments, the polymer-containing coating produced by the methods of the first and third embodiments disclosed herein as well as the polymer-containing coating according to the third embodiment can be understood as improving the adherability of the lower surface of the cured inner liner.

In other embodiments of the first-third embodiments, the lower surface of the cured inner liner is essentially free of polysiloxane moieties. By essentially free of polysiloxane moieties is meant that the lower surface comprises less than 1% by weight, less than 0.5% by weight, less than 0.1% by weight, or even 0% by weight polysiloxane moieties. As discussed in more detail below, when the lower surface of the cured inner liner upon which the polymer-containing coating is produced is essentially free of polysiloxane moieties, treatment with the coating composition produces a polymer-containing coating which will generally be tacky or adhesive prior to drying or curing and generally be non-tacky or non-sticky after drying or curing. In certain embodiments of the first-third embodiments, the polymer-containing coating is adhesive (e.g., tacky or sticky) and in other embodiments the polymer-containing coating is non-adhesive. In certain embodiments of the first-third embodiments, a polymer-containing coating that is non-adhesive may also be considered to be an adhesion film which increases the adherability of the lower surface of the cured inner liner. By adherability is meant the ability of other materials to adhere to the lower surface of the cured inner liner. Preferably, the non-adhesive film or adhesion film is capable of having a separate adhesive (e.g., a PSA) adhered to it. In certain embodiments, the polymer-containing coating produced by the methods of the first and third embodiments disclosed herein as well as the polymer-containing coating according to the third embodiment can be understood as improving the adherability of the lower surface of the cured inner liner.

According to the first-third embodiments, the cured inner liner having a polymer-containing coating upon its lower surface (as well as the cured inner liner which is treated with the coating composition) comprises rubber, a majority by weight of which butyl rubber which is optionally halogenated. (Unless indicated to the contrary, the following discussion concerning rubber(s), filler(s) and other ingredients of the cured inner liner applies equally to the cured inner liner having a polymer-containing coating upon its lower surface and to the cured inner liner which is treated with the coating composition.) Moreover, the following discussion should also be understood as applying to the composition of the cured inner liner but not the polymer-containing coating that is produced thereon (as the composition of the polymer-containing coating is discussed in detail in a separate section). In other words, the cured inner liner comprises rubber, and a majority by weight of the rubber of such inner liner comprises one or more butyl rubbers and each of those butyl rubbers is optionally halogenated. (As discussed below, in certain embodiments of the first-third embodiments, the cured inner liner further comprises one or more fillers and optionally one or more curatives mixed with the butyl rubber(s).) Butyl rubber is a copolymer of isobutylene and a small amount of a diene-based monomer, typically isoprene or para-methylstyrene. The polymer chains of butyl rubber therefore typically have a highly saturated backbone. Butyl rubber typically contains more than about 90% isobutylene and less than about 10% diene-based monomer (e.g., isoprene or para-methylstyrene) by weight in the copolymer, including about 90-99.5% isobutylene and about 10 to about 0.5% diene-based monomer, about 95-99.5% isobutylene and about 5-0.5% diene-based monomer, about 96-99% isobutylene and about 4-1% diene-based monomer, about 97-98.5% isobutylene and about 1.5-3% diene-based monomer, and including about 98% isobutylene and about 2% diene-based monomer by weight in the copolymer. Typically, the diene-based mer (e.g., isoprenyl or para-methylstyrenyl) units are distributed randomly in the polymer chains of butyl rubber. Non-limiting examples of suitable polymers for use as the at least one butyl rubber or a halogenated butyl rubber of the cured inner liner according to certain embodiments of the first-third embodiments disclosed herein include, but are not limited to, butyl rubber, chlorobutyl rubber, bromobutyl rubber, fluorobutyl rubber, iodobutyl rubber, copolymers thereof, and combinations thereof. In certain embodiments of the first-third embodiments, the cured inner liner comprises bromobutyl rubber. In certain embodiments of the first-third embodiments, the only rubber present in the cured inner liner (excepting the polymer-containing coating) is bromobutyl rubber (i.e., of 100 parts or 100 phr of rubber present in the cured inner liner all 100 parts or 100 phr is bromobutyl rubber).

In certain embodiments of the first-third embodiments disclosed herein, the cured inner liner comprises other ingredients in addition to the optionally halogenated butyl rubber(s). These other ingredients of the cured inner liner may vary but will generally include one or more fillers (e.g., carbon black, clay or silica) and a cure package (e.g., a vulcanizing agent such as sulfur and one or more vulcanization accelerators). In certain embodiments of the first-third embodiments disclosed herein, the cured inner liner comprises one or more butyl rubbers (optionally halogenated) and 10-100 phr (including 20-80 phr, 30-70 phr, 15 phr, 20 phr, 30 phr, 40 phr, 50 phr, 60 phr, 70 phr, 80 phr, 90 phr, etc.) of one or more of the foregoing fillers. In certain embodiments of the first-third embodiments, the rubber of the cured inner liner comprises at least 60% by weight (e.g., 60%, 65%, 70%, 75%, 80%, 85%, 90%, 95% or 100% by weight) of at least one of: a butyl rubber or halogenated butyl rubber (or a combination thereof, as discussed above). In certain embodiments of the first-third embodiments, the rubber of the cured inner liner comprises at least one of the following rubbers in addition to the butyl or halogenated butyl rubber(s): natural rubber, polyisoprene, styrene-butadiene rubber, isoprene rubber, polybutadiene rubber (preferably at least 90% cis bond content, even more preferably at least 95% cis bond content), nitrile rubber (acrylonitrile-butadiene copolymers), or hydrogenated nitrile rubber.

The thickness of the cured inner liner utilized in or included within the first-third embodiments may vary. In certain embodiments of the first-third embodiments, the cured inner liner has a thickness of 0.5-2 mm prior to application of the coating composition (or excepting the polymer-containing coating); in certain such embodiments, the thickness of the cured inner liner having the polymer-containing coating upon its lower surface (i.e., the thickness of the combination of the two) is no more than 3 mm, no more than 2.5 mm, or no more than 2 mm. In certain embodiments of the first-third embodiments, the thickness of the cured inner liner having the polymer-containing coating upon its lower surface (i.e., the thickness of the combination of the two) is 0.6 to 3 mm (e.g., 0.6, 0.7, 0.8, 0.9, 1, 1.5, 2, 2.5, or 3 mm), 0.6 to 2.5 mm, or 0.6 to 2 mm.

Treating the Lower Surface

As discussed above, according to the methods of the first and second embodiments disclosed herein, the lower surface of the cured inner liner is treated with the coating composition. The lower surface of the cured inner liner is the surface that will be positioned radially inward facing within a tire. According to the methods of the first and second embodiments, the treating may comprise various methods of applying the coating composition to the lower surface of the cured inner liner. In certain embodiments of the first and second embodiments, the treating comprises at least one of: spraying, rolling, painting, dipping, or pouring the rubber-containing liquid onto the lower surface of the cured inner liner. The painting may comprise use of a brush or a foam applicator.

Separate Adhesive

As discussed above, according to the method of the second embodiment and in certain embodiments of the method of the first embodiment, the tire component is adhered to the polymer-containing coating upon the lower surface of the inner liner. Similarly, according to the third embodiment, at least one component is positioned radially inward of the cured inner liner and is adhered to the polymer-containing coating of the lower surface of the cured inner liner. In certain embodiments of the first-third embodiments, a separate adhesive is used to adhere the tire component to the polymer-containing coating of the lower surface of the inner liner. In certain embodiments of the first-third embodiments, the separate adhesive is present on the tire component before it is adhered to the polymer-containing coating of the lower surface of the inner liner. In other embodiments of the first-third embodiments, the separate adhesive is present on the polymer-containing coating of the lower surface of the inner liner before the tire component is adhered to it; in certain such embodiments, the separate adhesive is sprayed upon the polymer-containing coating. In certain embodiments of the first-third embodiments, the at least one radially inward component comprises a noise barrier (e.g., a foam noise barrier) and a separate adhesive is used to adhere the noise barrier to the polymer-containing coating upon the lower surface of the inner liner.

In certain embodiments of the first-third embodiments, the separate adhesive comprises a pressure sensitive adhesive (PSA); the pressure sensitive adhesive may be applied in various forms such as by coating (e.g., by dipping, rolling on, pressing on), extruding on, or by use of a PSA tape. Various materials may be used for the adhesive to adhere the noise barrier (or foam noise barrier) to the radially inner surface of the tire, and suitable adhesives, including suitable pressure sensitive adhesives, are known and commercially available. Generally, the adhesive should be compatible with the materials of the tire (e.g., the component to whose radially inner surface the noise barrier or foam noise barrier is adhered). In certain embodiments of the first-third embodiments, the separate adhesive comprises at least one of the following: (1) rubber (e.g., natural rubber, butyl rubber, halobutyl rubber, polybutadiene rubber, styrene-butadiene rubber, or a combination thereof), (2) acrylic polymer (e.g., an acrylate made by copolymerizing one or more acrylic ester with one or more other monomers or one of those discussed above), (3) silicone rubber, (4) polyether adhesive, (5) polyurethane polymer; in certain such embodiments, the separate adhesive is a PSA.

Cured Tire

As discussed above, the second embodiment disclosed herein is directed to a method for producing a tire comprising a cured inner liner and at least one component positioned radially inward of the cured inner liner. It should be understood that the tire of the second embodiment is a cured tire, e.g., having been cured in a tire press. In certain embodiments of the second embodiment, the tire can be understood as also including a tire body. As also discussed above, the third embodiment disclosed herein is directed to a cured tire comprising a tire body, a cured inner liner, and at least one component positioned radially inward of the cured inner liner. In certain embodiments of the third embodiment, the cured tire can be understood as resulting from a method according to the third embodiment.

In certain embodiments of the second and third embodiments, the tire or cured tire further comprises at least one of: a tread, one or more body plies, a cap ply, or a sidewall. In certain embodiments of the second and third embodiments, the cured tire is a pneumatic tire. Generally, within a tire, a body ply is positioned radially inward of the tread and radially outward of the inner liner and comprises a layer comprising rubber-covered textile cords. In a tire comprising a pair of annular beads, the body ply is wrapped circumferentially around the tire and extends from bead to bead, in certain embodiments extending around the beads. In certain embodiments of the second and third embodiments, the tire comprises a body ply positioned radially outward of the inner liner; in certain such embodiments the body ply is adjacent to the inner liner with no intervening layer(s) between and in other such embodiments the body ply is separated from the inner liner by one or more intervening layers. In certain instances, the body ply is termed a carcass ply. A carcass ply is positioned radially inward of the tire tread and radially outward of the inner liner and also comprises a layer comprising rubber-covered textile cords; in certain tires of the second and third embodiments, one or more carcass plies are utilized and are positioned such that they extend from bead to bead in the tire with their respective cords positioned radially or diagonally (i.e., not circumferentially). When more than one carcass ply is utilized, each may be positioned such that their cord direction differs (e.g., biased to each other). Generally, within a tire, a cap ply is a layer that is positioned radially inward of the tread and radially outward of the inner liner, and also comprises rubber-covered textile cords. In certain embodiments of the second and third embodiments, the tire or cured tire comprises at least one belt ply positioned radially outward of a body ply and a cap ply positioned radially outward and circumferentially over all of a portion of the axial width of the belt ply or plies.

Radially Inward Component

As discussed above, the second and third embodiments disclosed herein include at least one component positioned radially inward of the inner liner and the particular at least one component may vary. Similar, in certain embodiments of the first embodiment, the method further comprises adhering a tire component to the polymer-containing coating upon the radially inward-facing surface of the cured inner liner and in such embodiments, the following discussion should be understood as applying to the first embodiment as to the second and third embodiments. In certain embodiments of the second and third embodiments, the at least one component comprises: a noise barrier, an air barrier layer, a sealant layer, a run-flat insert, an electronic communication module, or a combination thereof. In certain embodiments of the second and third embodiments disclosed herein, the at least one component radially inward of the inner liner directly contacts the polymer-containing coating upon the lower surface (radially inward-facing surface) of the cured inner liner. In otherwords, in such embodiments, no separate adhesive or other material is located between the at least one component and the polymer-containing coating upon the lower surface of the cured inner liner. Generally, the at least one component may directly contact the polymer-containing coating upon the lower surface of the cured inner liner when the coating has adhesive properties. In other embodiments of the second and third embodiments disclosed herein, the at least one component radially inward of the inner liner does not directly contact the polymer-containing coating upon the lower surface of the cured inner liner, although in such embodiments the component can still be considered to be adhered to the polymer-containing coating upon the radially inward-facing surface of the curd inner liner. In other words, in such embodiments, a separate adhesive or other material is located between the at least one component and the polymer-containing coating upon the lower surface of the cured inner liner. Generally, the at least one component may not directly contact the polymer-containing coating upon the lower surface of the cured inner liner when the coating is either non-adhesive or is not sufficiently adhesive.

In certain embodiments of the second and third embodiments, the at least one component comprises a noise barrier; in certain such embodiments, the noise barrier comprises a foam noise barrier. The noise barrier or foam noise barrier (when present) may be made from various materials. Generally, a light-weight and low-density flexible material such as foamed rubber, foamed synthetic resin, or cellular plastic will be utilized for a foam noise barrier. According to the second and third embodiments, the foam noise barrier (when present) may comprise a foamed material (or spongy materials) that is either an open-cell type or a closed-cell type, although open-cell types are preferred. As non-limiting examples, the material of the foam noise barrier (when present) may comprise a synthetic resin foam such as ether based polyurethane foam, ester based polyurethane foam, polyethylene foam and the like; rubber foam such as chloroprene rubber foam, ethylene-propylene rubber foam, nitrile rubber foam, silicone rubber foam, or a combination thereof. In certain embodiments of the second and third embodiments, the foam noise barrier (when present) comprises polyethylene foam, polyurethane foam, or a combination thereof. When a separate adhesive is used to adhere the noise barrier (or foam noise barrier), that adhesive may be applied to the noise barrier (or foam noise barrier), to the radially inner surface of the tire (i.e., the polymer-containing coating upon the lower surface of the inner liner) to which the foam barrier (or foam noise barrier) will be adhered, or to both.

In certain embodiments of the second and third embodiments, the at least one component radially inward of the inner liner comprises a sealant layer, preferably without any adhesive layer between the sealant layer and the lower surface of the inner liner (i.e., the sealant layer directly contacts the polymer-containing coating upon the lower surface of the inner liner). In certain embodiments of the second and third embodiments, the sealant is applied to the tire inner liner and functions to seal a puncture (e.g., from a nail) and prevent air from leaking from the tire (or at least slow the air leakage) after the puncture.

In certain embodiments of the second and third embodiments, the at least one component radially inward of the inner liner comprises an air barrier layer, preferably without any adhesive layer between the air barrier layer and the lower surface of the inner liner having the polymer-containing coating (i.e., the air barrier directly contacts the polymer-containing coating upon the lower surface of the inner liner). In certain embodiments, the air barrier layer is applied as a spray-on material and functions to enhance the air impermeability of the inner liner, thereby better retaining air within a pneumatic tire.

In certain embodiments of the second and third embodiments, the at least one component radially inward of the inner liner comprises a run-flat insert. In certain such embodiments, the run-flat insert comprises a self-supporting run-flat insert such as may be used in the sidewall of a tire to produce a run-flat tire or self-supporting run-flat tire. A run-flat insert that is used in the sidewall of a tire may be positioned either axially inward or axially outward of the body ply. In certain embodiments of the second and third embodiments, the run-flat insert will comprise the radially innermost (or axially innermost) component in the sidewall portion of the tire; in certain such embodiments, the inner liner will comprise the radially innermost component in the remaining portion of the tire.

In certain embodiments of the second and third embodiments, the at least one component radially inward of the inner liner comprises an electronic communication module. In certain embodiments of the second and third embodiments, the electronic communication module comprises a radio device; in certain such embodiments, at least a portion of the outer surface of the radio device is surrounded by a rubber coating. As used herein, the term radio device should be understood to include any suitable radio device known in the art capable of storing information (i.e., data), communicating information, or both storing and communicating information with another device. In certain embodiments of the second and third, the radio device disclosed herein is capable of conveying information. The conveying of information by the radio device comprises the receipt of a radio signal combined with transponding (by reflecting) a portion of the received radio signal back to a reader with a signal modulated by varying the radio device's antenna impedance. Generally, such a radio device which conveys information by transponding in response to being activated by energy (e.g., electromagnetic waves) sent by an external, remote transponder (e.g., an interrogator-type or reader-type of transponder) is considered a passive device. In certain embodiments, the radio device disclosed herein is capable of actively transmitting information; such a radio device is an active device because it can actively transmit information. Certain such active devices transmit without the need for any activation by an external, remote transponder (e.g., at periodic intervals) and other such active devices actively transmit information in response to an appropriate activation received from an external, remote transponder. In certain embodiments of the second and third embodiments disclosed herein, the radio device conveys or transmits information via electromagnetic radio waves having a frequency in the range that is allowable according to local regulations. For example, in the United States, this frequency generally ranges from about 900 MHz to about 930 MHz (including 900 MHz to 930 MHz) (the current approved range being 902-928 MHz at a power level not to exceed 36 dbm) and in portions of Europe and Asia may be at a somewhat lower frequency of about 860 MHz (including 860 Mz) (the current approved range in portions of Europe is 865.6-867.6 MHz at a power level not to exceed 33 dBm). Generally, the radio devices discussed herein will be designed to convey or transmit information at a frequency ranging from about 860 MHz to about 960 MHz (including 860 MHz to 960 MHz). However, in certain embodiments of the second and third embodiments disclosed herein, the radio devices discussed herein may be designed to convey or transmit information at another frequency range. Examples of suitable radio devices for use with the electronic communication modules disclosed herein include transponders (e.g., devices that both receive information and transpond at least a portion of it), transmitters, receivers, and reflectors. Generally, the radio device is configured to convey or transmit information to/from an external, remote communication device, which itself may be a transponder, transmitter, receiver, or reflector depending on the functionality of the radio device of the electronic communication module of the second and third embodiments that it is communicating with (e.g., if the remote communication device is a transmitter, the electronic communication module's radio device is a transponder, receiver, or reflector capable of interacting with the electromagnetic waves sent from the transmitter). As used herein, the term "radio device" is inclusive of any and all of the components necessary to operate as a transponder, transmitter, receiver, or reflector, e.g., a circuit board, memory, antenna, etc.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A method for producing a polymer-containing coating upon a cured inner liner for a tire comprising:
   a. providing a cured inner liner comprising rubber, a majority of which comprises butyl rubber, optionally halogenated, wherein the cured inner liner has an upper and a lower surface and the lower surface of the cured inner liner is essentially free of polysiloxane moieties,
   b. treating the lower surface of the cured inner liner with a coating composition comprising:
      i. a silyl-terminated polymer in an amount of 40 to 75% by weight, based upon the total weight of the composition used to treat the lower surface of the inner liner,
      ii. at least one plasticizer in an amount of about 5 to about 35% by weight, based upon the total weight of the composition used to treat the lower surface of the inner liner,
      iii. at least one tackifier in an amount of about 5 to about 25% by weight, based upon the total weight of the composition used to treat the lower surface of the inner liner, iv. at least one adhesion promoter in an amount of about 1 to about 10% by weight, based upon the total weight of the composition used to treat the lower surface of the inner liner,
v. at least one moisture scavenger in an amount of about 0.5 to about 5% by weight, based upon the total weight of the composition used to treat the lower surface of the inner liner,
vi. at least one catalyst in an amount of about 0.1 to about 5% by weight, based upon the total weight of the composition used to treat the lower surface of the inner liner,
vii. optionally at least one antioxidant, and
viii. no more than 10% by weight of filler, based upon the total weight of the composition used to treat the lower surface of the inner liner, thereby creating a polymer-containing coating upon the treated surface of the cured inner liner.

2. The method of claim 1, wherein
the silyl-terminated polymer comprises a silyl-terminated polyether, a silyl-terminated polyurethane, or a combination thereof;
the plasticizer comprises a phthalate, a dibenzoate, a fatty acid alkyl ester, epoxidized plant oil, or a combination thereof;
the tackifier comprises a hydrocarbon resin, a low molecular weight polymer or oligomer, or a combination thereof;
the at least one adhesion promoter comprises a bi-functional silane;
the at least one moisture scavenger comprises a vinyl alkoxysilane, an alkyltrialkoxysilane, an oxazolidine, calcium oxide, anhydrous silica, anhydrous sodium sulfate, anhydrous calcium sulfate, a zeolites, or a combination thereof;
the at least one catalyst comprises at least one basic compound selected from alkali metal hydroxides, silanolates, organic amines, alkali metal carbonates, alkali metal bicarbonates, and combinations thereof or from at least one acidic compound selected from sulfuric acid, phosphoric acid, hydrochloric acid, organic acids, Lewis acids, metal halides, organotin compounds, titanium compounds, and combinations thereof; and
the at least one antioxidant is present in an amount of about 0.1 to about 3% by weight, based upon the total weight of the composition used to treat the lower surface of the inner liner, and comprises a hindered phenol, a hindered amine, a catechol, a phosphate ester, or a combination thereof.

3. The method of claim 2, wherein the silyl-terminated polymer comprises a silyl-terminated polyether present in an amount of 40-60% by weight, based upon the total weight of the coating composition.

4. The method of claim 1, wherein the composition of (b) further comprises at least one thixotrope.

5. An inner liner having a polymer-containing coating produced according to the method of claim 1.

6. A tire comprising the inner liner of claim 5.

7. A method for producing a tire comprising a cured inner liner and at least one component positioned radially inward of the cured inner liner, the method comprising:
a. providing a tire body comprising a cured inner liner comprising rubber, a majority of which comprises butyl rubber, optionally halogenated, wherein the cured inner liner comprises an upper surface and a lower surface which is radially inward-facing within the tire body and the lower surface of the cured inner liner is essentially free of polysiloxane moieties;
b. treating the lower surface of the cured inner liner with a coating composition to form a polymer-containing coating upon the radially inward-facing surface of the cured inner liner, the coating composition comprising
i. a silyl-terminated polymer in an amount of 40 to about 75% by weight, based upon the total weight of the polymer-containing coating,
ii. at least one plasticizer in an amount of about 5 to about 35% by weight, based upon the total weight of the polymer-containing coating,
iii. at least one tackifier in an amount of about 5 to about 25% by weight, based upon the total weight of the polymer-containing coating,
iv. at least one adhesion promoter in an amount of about 1 to about 10% by weight, based upon the total weight of the polymer-containing coating,
v. at least one moisture scavenger in an amount of about 0.5 to about 5% by weight, based upon the total weight of the polymer-containing coating,
vi. at least one catalyst in an amount of about 0.1 to about 5% by weight, based upon the total weight of the polymer-containing coating,
vii. optionally at least one antioxidant, and
viii. no more than 10% by weight of filler, based upon the total weight of the polymer-containing coating; and
c. providing a tire component and adhering the component to the polymer-containing coating upon the radially inward-facing surface of the cured inner liner.

8. The method of claim 7, wherein adhering in (c) comprises use of a separate adhesive.

9. The method of claim 7, wherein
i. the silyl-terminated polymer comprises a silyl-terminated polyether, a silyl-terminated polyurethane, or a combination thereof;
ii. the plasticizer comprises a phthalate, a dibenzoate, a fatty acid alkyl ester, epoxidized plant oil, or a combination thereof;
iii. the tackifier comprises a hydrocarbon resin, a low molecular weight polymer or oligomer, or a combination thereof;
iv. the at least one adhesion promoter comprises a bi-functional silane;
v. the at least one moisture scavenger comprises a vinyl alkoxysilane, an alkyltrialkoxysilane, an oxazolidine, calcium oxide, anhydrous silica, anhydrous sodium sulfate, anhydrous calcium sulfate, a zeolites, or a combination thereof;
vi. the at least one catalyst comprises at least one basic compound selected from alkali metal hydroxides, silanolates, organic amines, alkali metal carbonates, alkali metal bicarbonates, and combinations thereof or from at least one acidic compound selected from sulfuric acid, phosphoric acid, hydrochloric acid, organic acids, Lewis acids, metal halides, organotin compounds, titanium compounds, and combinations thereof; and
vii. the at least one antioxidant is present in an amount of about 0.1 to about 3% by weight, based upon the total weight of the polymer-containing coating, and comprises a hindered phenol, a hindered amine, a catechol, a phosphate ester, or a combination thereof.

10. The method of claim 9, wherein the composition of (b) further comprises at least one thixotrope.

11. The method of claim 9, wherein the silyl-terminated polymer comprises a silyl-terminated polyether present in an amount of 40-60% by weight, based upon the total weight of the polymer-containing coating.

12. The method of claim 7, wherein the at least one radially inward component comprises at least one of: a noise barrier, an air barrier layer, a sealant layer, a run-flat insert, or an electronic communication module.

13. A cured tire comprising a tire body, a cured inner liner, and at least one component positioned radially inward of the cured inner liner,
   the cured inner liner comprising rubber, a majority of which comprises butyl rubber optionally halogenated, wherein the cured inner liner has an upper surface and a lower surface with the lower surface positioned radially inward within the tire and the lower surface of the cured inner liner is essentially free of polysiloxane moieties, and,
   the lower surface of the cured inner liner includes a polymer-containing coating comprising
      i. a silyl-terminated polymer in an amount of 40 to about 75% by weight, based upon the total weight of the polymer-containing coating,
      ii. at least one plasticizer in an amount of about 5 to about 35% by weight, based upon the total weight of the polymer-containing coating,
      iii. at least one tackifier in an amount of about 5 to about 25% by weight, based upon the total weight of the polymer-containing coating,
      iv. at least one adhesion promoter in an amount of about 1 to about 10% by weight, based upon the total weight of the polymer-containing coating,
      v. optionally at least one moisture scavenger in an amount of about 0.5 to about 5% by weight, based upon the total weight of the polymer-containing coating,
      vi. at least one catalyst in an amount of about 0.1 to about 5% by weight, based upon the total weight of the polymer-containing coating,
      vii. optionally at least one antioxidant, and
      viii. no more than 10% by weight of filler, based upon the total weight of the polymer-containing coating,
   wherein the polymer-containing coating has a thickness of about 10 to about 1000 micrometers, and
   the at least one component positioned radially inward of the cured inner liner is adhered to the polymer-containing coating of the lower surface of the cured inner liner.

14. The cured tire of claim 13, wherein the polymer-containing coating comprises
   i. the silyl-terminated polymer comprises a silyl-terminated polyether, a silyl-terminated polyurethane, or a combination thereof;
   ii. the plasticizer comprises a phthalate, a dibenzoate, a fatty acid alkyl ester, epoxidized plant oil, or a combination thereof;
   iii. the tackifier comprises a hydrocarbon resin, a low molecular weight polymer or oligomer, or a combination thereof;
   iv. the at least one adhesion promoter comprises a bi-functional silane;
   v. the at least one moisture scavenger comprises a vinyl alkoxysilane, an alkyltrialkoxysilane, an oxazolidine, calcium oxide, anhydrous silica, anhydrous sodium sulfate, anhydrous calcium sulfate, a zeolites, or a combination thereof;
   vi. the at least one catalyst comprises at least one basic compound selected from alkali metal hydroxides, silanolates, organic amines, alkali metal carbonates, alkali metal bicarbonates, and combinations thereof or from at least one acidic compound selected from sulfuric acid, phosphoric acid, hydrochloric acid, organic acids, Lewis acids, metal halides, organotin compounds, titanium compounds, and combinations thereof; and
   vii. the at least one antioxidant comprises a hindered phenol, a hindered amine, a catechol, a phosphate ester, or a combination thereof.

15. The cured tire of claim 14, wherein the polymer-containing coating further comprises at least one thixotrope.

16. The cured tire of claim 14, wherein the silyl-terminated polymer of the polymer-containing coating comprises a silyl-terminated polyether present in an amount of 40-60% by weight (based upon the total weight of the coating composition).

17. The cured tire of claim 14, wherein the at least one radially inward component is a noise barrier.

18. The cured tire of claim 13, wherein the at least one radially inward component comprises at least one of: a noise barrier, an air barrier layer, a sealant layer, a run-flat insert, or an electronic communication module.

19. The cured tire of claim 13, wherein the at least one radially inward component is a noise barrier.

* * * * *